US011275064B2

(12) United States Patent
Sabolis et al.

(10) Patent No.: US 11,275,064 B2
(45) Date of Patent: Mar. 15, 2022

(54) GAS CHROMATOGRAPH DEVICE WITH POSITIONING SYSTEM FOR THE INLET LINER AND THE COLUMN AND METHOD OF USE THEREOF

(71) Applicant: CEM Corporation, Lucidity Division, Matthews, NC (US)

(72) Inventors: Alyssa Whitney Sabolis, Weddington, NC (US); Michael John Collins, Jr., Huntersville, NC (US); Michael Craig Davis, Tega Cay, SC (US); Daniel Charles Scheid, Indian Trail, NC (US); Brian Thomas Unites, Shelby, NC (US); Richard Michael Chapman, Fort Mill, SC (US)

(73) Assignee: CEM CORPORATION, LUCIDITY DIVISION, Mathews, NC (US)

( * ) Notice: Subject to any disclaimer, the term of this patent is extended or adjusted under 35 U.S.C. 154(b) by 812 days.

(21) Appl. No.: 16/047,562

(22) Filed: Jul. 27, 2018

(65) Prior Publication Data

US 2019/0033270 A1 Jan. 31, 2019

Related U.S. Application Data

(60) Provisional application No. 62/537,803, filed on Jul. 27, 2017.

(51) Int. Cl.
*B01D 53/02* (2006.01)
*G01N 30/60* (2006.01)
(Continued)

(52) U.S. Cl.
CPC ......... *G01N 30/6047* (2013.01); *G01N 30/18* (2013.01); *G01N 30/30* (2013.01);
(Continued)

(58) Field of Classification Search
CPC ....... G01N 2030/025; G01N 2030/185; G01N 2030/3084; G01N 2030/8804;
(Continued)

(56) References Cited

U.S. PATENT DOCUMENTS 3,562,501 A 2/1971 Mears
3,751,966 A 8/1973 Ryan et al.
(Continued)

OTHER PUBLICATIONS

International Search Report and Written Opinion dated Oct. 10, 2018 for PCT/US2018/044187.

*Primary Examiner* — Christopher P Jones
(74) *Attorney, Agent, or Firm* — Jeffrey C. Watson; Grell & Watson Patent Attorneys LLC

(57) ABSTRACT

A gas chromatograph with a positioning system for the inlet liner and the column includes a column and the positioning system for the inlet liner and the column. The column is configured for gas chromatography. Wherein, the positioning system for the inlet liner and the column is configured to position the inlet liner and the column with respect to one another. The positioning system for the inlet liner and the column is configured to repeatably and optimally position the inlet liner and the column with respect to one another. The positioning system for the inlet liner and the column positions the inlet liner in a perpendicular orientation to the column.

20 Claims, 19 Drawing Sheets

(51) Int. Cl.
*G01N 30/18* (2006.01)
*G01N 30/30* (2006.01)
*G01N 30/86* (2006.01)
*G01N 30/88* (2006.01)
*G01N 30/02* (2006.01)

(52) U.S. Cl.
CPC ....... *G01N 30/606* (2013.01); *G01N 30/8696* (2013.01); *G01N 30/88* (2013.01); *G01N 30/6026* (2013.01); *G01N 30/6091* (2013.01); *G01N 2030/025* (2013.01); *G01N 2030/185* (2013.01); *G01N 2030/3084* (2013.01); *G01N 2030/8804* (2013.01)

(58) Field of Classification Search
CPC .... G01N 30/18; G01N 30/30; G01N 30/6026; G01N 30/6047; G01N 30/606; G01N 30/6091; G01N 30/8696; G01N 30/88
See application file for complete search history.

(56) References Cited

U.S. PATENT DOCUMENTS

| | | | |
|---|---|---|---|
| 3,779,066 A * | 12/1973 | Fore | G01N 7/14 73/23.25 |
| 3,824,838 A | 7/1974 | Ohtsu et al. | |
| 3,834,549 A | 9/1974 | Burg et al. | |
| 4,345,463 A | 8/1982 | Wilson et al. | |
| 5,804,701 A * | 9/1998 | Berger | G01N 30/30 73/23.42 |
| 6,338,823 B1 | 1/2002 | Furukawa | |
| 6,386,014 B1 | 5/2002 | Butch | |
| 7,369,945 B2 | 5/2008 | Miller et al. | |
| 8,506,688 B2 * | 8/2013 | De Zeeuw | G01N 30/32 96/106 |
| 9,027,384 B2 | 5/2015 | Rhodes et al. | |
| 9,250,218 B2 | 2/2016 | Ovadia et al. | |
| 2003/0015019 A1 | 1/2003 | O'Brien | |
| 2004/0132209 A1 | 7/2004 | Alexanian et al. | |
| 2007/0089603 A1 | 4/2007 | Emmons et al. | |
| 2009/0249959 A1 * | 10/2009 | Jones | G01N 30/32 96/106 |
| 2010/0256922 A1 | 10/2010 | Roques et al. | |
| 2011/0211992 A1 | 9/2011 | Mannino et al. | |
| 2011/0305608 A1 * | 12/2011 | Gerstel | G01N 30/12 422/527 |
| 2014/0150660 A1 * | 6/2014 | Klee | B01D 53/02 96/106 |
| 2014/0250978 A1 * | 9/2014 | McCauley | G01N 30/26 73/23.39 |
| 2015/0155314 A1 | 6/2015 | Karoum et al. | |
| 2016/0139089 A1 | 5/2016 | Ovadia et al. | |
| 2017/0023534 A1 * | 1/2017 | McCauley | G01N 30/18 |
| 2017/0108475 A1 * | 4/2017 | Guth | G01N 30/12 |

* cited by examiner

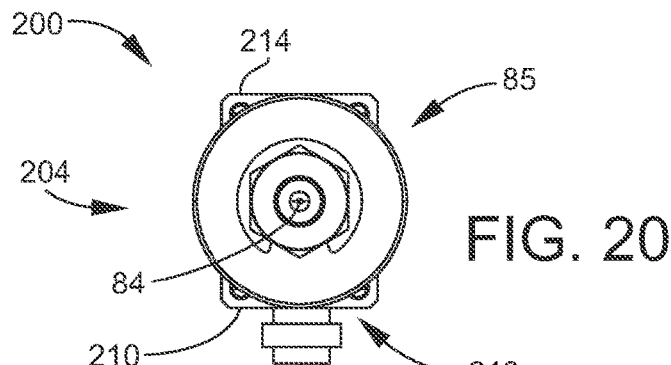
FIG. 20
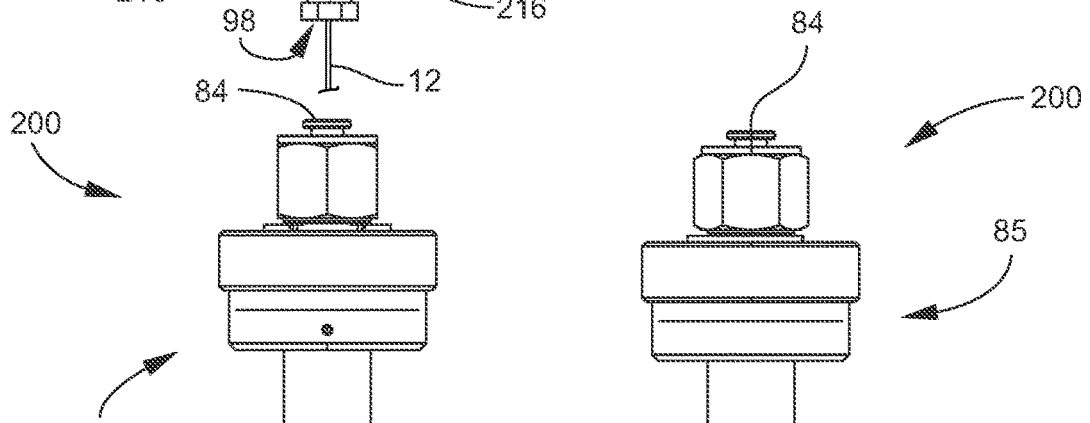
FIG. 21
FIG. 22
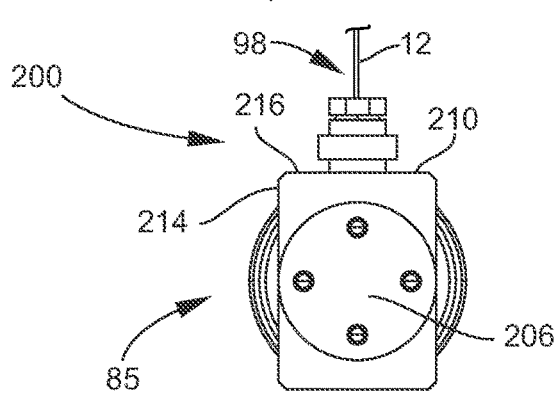
FIG. 23

GAS CHROMATOGRAPH DEVICE WITH POSITIONING SYSTEM FOR THE INLET LINER AND THE COLUMN AND METHOD OF USE THEREOF

CROSS-REFERENCE TO RELATED APPLICATIONS

This application claims benefit of priority application, U.S. Provisional Ser. No. 62/537,803 filed on Jul. 27, 2017 entitled "Gas Chromatograph (GC) With At Least A Removable Column Holder, Positioning System for The Inlet Liner And The Column, Column Recognition Technology, Inductively Heated Column and/or Miniaturized Dimensions", which is incorporated herein by reference in its entirety.

FIELD OF THE DISCLOSURE

The present disclosure is directed to gas chromatographs, also known as GCs. More specifically, the instant disclosure is directed to a gas chromatograph or GC with a positioning system for the inlet liner and the column.

BACKGROUND

Gas chromatography (GC) is a common type of chromatography used in analytical chemistry for separating and analyzing compounds that can be vaporized without decomposition. Gas chromatography is also sometimes known as vapor-phase chromatography (VPC), or gas-liquid partition chromatography (GLPC). Typical uses of GC may include testing the purity of a particular substance, or separating the different components of a mixture, and determining the relative amounts of different components of a mixture. As a result, in some situations, GC may be useful in identifying a compound. As another example, in preparative chromatography, GC can be used to prepare pure compounds from a mixture.

In gas chromatography, the mobile phase (or "moving phase") is a carrier gas, usually an inert gas such as helium or an unreactive gas such as nitrogen. Helium remains the most commonly used carrier gas in most common instruments, however, hydrogen is preferred for improved separations. The stationary phase is a microscopic layer of liquid or polymer on an inert solid support, inside a piece of tubing (typically glass or metal) called a column. The instrument used to perform gas chromatography is called a gas chromatograph (also known as an "aerograph" or "gas separator").

The gaseous compounds being analyzed interact with the walls of the column, which is coated with a stationary phase. This causes each compound to elute at a different time, known as the retention time of the compound. The comparison of retention times is what gives GC its analytical usefulness.

Gas chromatography is, in principle, like column chromatography (as well as other forms of chromatography, such as HPLC, TLC), but has several notable differences. First, the process of separating the compounds in a mixture is carried out between a liquid stationary phase and a gas mobile phase. On the other hand, in column chromatography the stationary phase is a solid and the mobile phase is a liquid. Therefore, the full name of the procedure is "gas-liquid chromatography", referring to the mobile and stationary phases, respectively. Second, the column, through which the gas phase passes, is located in an oven where the temperature of the gas can be controlled. On the other hand, standard column chromatography typically has no such temperature control. Finally, the concentration of a compound in the gas phase is solely a function of the vapor pressure of the gas. Gas chromatography is also like fractional distillation, since both processes separate the components of a mixture primarily based on boiling point (or vapor pressure) differences. However, fractional distillation is typically used to separate components of a mixture on a large scale, whereas GC can be used on a much smaller scale (i.e. microscale).

One problem that has been discovered with known gas chromatographs is their size, cost, and ease of use, as known gas chromatographs are typically laboratory grade. Currently, laboratory grade gas chromatographs are large expensive machines that require extensive training for operation. This leads to gas chromatographs being found mainly in academia or industrial labs. For example, in research universities, where each university may only have one gas chromatograph located in a designated area or even room, which is shared among many departments, thereby requiring users to schedule time with the gas chromatograph and its operator(s). This problem may be similar in most industrial labs as well. As such, to provide better access to GC, there is clearly a need to provide a gas chromatograph that is smaller, costs less, and is easier to use.

As an example of the difficulty with use, in typical gas chromatographs, the inlet liner and column are inserted into the GC in such a manner that their position can be adjusted, so the user must be highly trained to ensure that both are in the proper position to give a good chromatogram. Once injected, samples exit the inlet liner and enter the column for separation so this junction is a very critical one for proper results, i.e. positioning of the inlet liner with the column is critical. In addition, there is inevitably variability in this positioning from user to user, unit to unit, and location to location, which creates variability in the results making samples hard to compare to one another. As a result, there is clearly a need for a positioning system for the inlet liner and column that is easier to use and provides repeatable positioning thereby leading to more repeatable and comparable results from location to location, system to system, user to user, over time as liners and columns are removed and replaced.

As another example of the difficulty of use, a discovered problem with current gas chromatograph systems is the interchange between the injection liner in the injection manifold and the front end of the column. The user injects a liquid or gas mixture into the injection liner which is flash heated to vaporize most of the components in the mixture. The front end (the head) of the GC column is positioned near the outlet of the injection liner with slight gas flow to "sniff" this component mixture and begin moving the mixture through the column thereby separating the mixture on its way to the detector. The position of the head of the column with respect to the back end of the inlet liner is critically important for the collection of usable data. Variations in this positioning will create variations in the data making it very difficult to reproduce. The current standard practice is to measure how much length of column to allow protruding through the fitting that secures the head of the column to the injection manifold. The value for this measurement must be looked up online or in the particular instrument operation manual. Even when measured, it will move slightly as the fitting is secured. The inlet liner positioning is determined by the O-ring that is placed around the liner to seal it in the injector port. The value of that position must also be looked up and care must be taken that the position of this O-ring does not change during handling. As a result, the current positioning of the inlet liner and the head of the column is extremely variable and prone to a lot of operator error. Therefore, a need clearly exists for a more reliable and repeatable way of positioning the inlet liner with the column.

The instant disclosure is designed to address at least certain aspects of the problems or needs discussed above by providing a gas chromatograph with at least a positioning system for the inlet liner and the column.

SUMMARY

Accordingly, in one aspect, the present disclosure embraces a gas chromatograph device that includes a positioning system for the inlet liner and the column. The column is configured for gas chromatography. Wherein, the positioning system for the inlet liner and the column may be configured to position the inlet liner and the column with respect to one another.

One feature of the gas chromatograph with the positioning system for the inlet liner and the column may be that it can be configured to repeatably and optimally position the inlet liner and the column with respect to one another.

Another feature of the gas chromatograph with the positioning system for the inlet liner and the column may be that the positioning system can position the inlet liner in a perpendicular orientation to the column. Wherein, the perpendicular orientation may be configured to minimize contamination on the column.

In select embodiments of the instant gas chromatograph device, the positioning system for the inlet liner and the column may generally include an injector port pin connected to the first tip of the column. Wherein, the end of the injector port pin may be positioned below a bottom of the inlet liner in the perpendicular orientation.

In select embodiments of the instant gas chromatograph device, the positioning system for the inlet liner and the column may further include a mating device and a mating surface. The mating device may be configured to receive and position the inlet liner. The mating device may be configured to hold the bottom of the inlet liner at a first specific location in the positioning system. The mating surface may be configured to receive and position the injector port pin. The mating surface may be configured to hold a first tip of the injector port pin at a second specific location in the positioning system. Whereby, the combination of the mating surface and the mating device may be configured to position the first tip of the injector port pin positioned at the second specific location below the bottom of the inlet liner positioned at the first specific location in the perpendicular orientation.

In select embodiments of the instant gas chromatograph device with the positioning system for the inlet liner and the column, the mating device may be include in a mating box. The mating box may have one side with the mating surface. Wherein, the mating device may be positioned inside the mating box and may be configured to hold the inlet liner at the first specific location within the mating box. Where the mating surface on the one side of the mating box may be configured to position the first tip of the injector port pin at the second specific location below the bottom of the inlet liner positioned at the first specific location in the mating box in the perpendicular orientation.

In select embodiments of the instant gas chromatograph device with the positioning system for the inlet liner and the column, the positioning system may further include a removable column holder. The removable column holder may house the column. The removable column holder may be configured to be removable from the positioning system in the gas chromatograph device with the column. The removable column holder may include the injector port pin connected to the first tip of the column at one end. The injector port pin may be configured to provide a first air tight seal to the mating surface of the positioning system in the gas chromatograph device.

Another feature of the instant gas chromatograph device with the positioning system for the inlet liner and the column may be that the positioning system can include a trap. The trap may be positioned below the bottom of the inlet liner. The trap may be configured for collecting unwanted compounds from the inlet liner before reaching the injector port pin of the column.

In select embodiments of the instant gas chromatograph device with the positioning system for the inlet liner and the column, the mating device may include a side channel and a center channel. The side channel may be configured to seal to the first tip of the injector port pin positioned in the mating surface at the second specific location. The center channel may be configured to seal to the bottom of the inlet liner. The side channel may be in fluid communication with the center channel. Wherein, the inlet liner may be in fluid communication with the injector port pin of the column via the fluid communication between the side channel and the center channel in the perpendicular orientation.

In other select embodiments of the instant gas chromatograph device, the positioning system for the inlet liner and the column may further include an injector port and an injection manifold. The injection manifold may be configured to seal the injector port with the inlet liner. Wherein, the injection manifold may be configured to be flash heated for heating up the inlet liner. In select embodiments, a bottom of the injection manifold may be positioned in a recess in a top of a mating box of the positioning system.

In other select embodiments, the instant gas chromatograph device with the positioning system for the inlet liner and the column may further include a frame, a cover, gas fittings in fluid communication with the injector port, a detector, and at least one vent hole in the cover configured for providing air flow through the column via at least one fan.

In another aspect, the instant disclosure embraces the positioning system for an inlet liner and a column of the gas chromatograph device. The positioning system may be any of the various embodiments of the positioning system shown and/or described herein. In general, in select embodiments, the positioning system for the inlet liner and the column may include an injector port pin connected to the first tip of the column, a mating device, and a mating surface. The mating device may be configured to receive and position the inlet liner. The mating device may be configured to hold a bottom of the inlet liner at a first specific location in the positioning system. The mating surface may be configured to receive and position the injector port pin. The mating surface may be configured to hold a first tip of the injector port pin at a second specific location in the positioning system. Whereby, the combination of the mating surface and the mating device may be configured to position the first tip of the injector port pin positioned at the second specific location below the bottom of the inlet liner positioned at the first specific location in the perpendicular orientation.

One feature of the positioning system for the inlet liner and the column may be that it can be configured to repeatably and optimally position the inlet liner and the column with respect to one another.

Another feature of the positioning system for the inlet liner and the column may be that the positioning system can position the inlet liner in a perpendicular orientation to the column, where the perpendicular orientation may be configured to minimize contamination on the column.

In select embodiments of the instant positioning system for the inlet liner and the column, the mating device may be included in a mating box. The mating box may have one side with the mating surface. Wherein, the mating device may be positioned inside the mating box and may be configured to hold the inlet liner at the first specific location within the mating box. Where the mating surface on the one side of the mating box may be configured to position the first tip of the injector port pin at the second specific location below the bottom of the inlet liner positioned at the first specific location in the mating box in the perpendicular orientation.

In select embodiments, the instant positioning system for the inlet liner and the column may further include a removable column holder. The removable column holder may house the column. The removable column holder may be configured to be removable from the positioning system with the column. The removable column holder may include the injector port pin connected to the first tip of the column at one end. The injector port pin may be configured to provide a first air tight seal to the mating surface of the positioning system in the gas chromatograph device.

Another feature of the instant positioning system for the inlet liner and the column may be that the positioning system can include a trap. The trap may be positioned below the bottom of the inlet liner. The trap may be configured for collecting unwanted compounds from the inlet liner before reaching the injector port pin of the column.

In select embodiments of the instant positioning system for the inlet liner and the column, the mating device may include a side channel and a center channel. The side channel may be configured to seal to the first tip of the injector port pin positioned in the mating surface at the second specific location. The center channel may be configured to seal to the bottom of the inlet liner. The side channel may be in fluid communication with the center channel. Wherein, the inlet liner may be in fluid communication with the injector port pin of the column via the fluid communication between the side channel and the center channel in the perpendicular orientation.

In other select embodiments, the instant positioning system for the inlet liner and the column may further include an injector port and an injection manifold. The injection manifold may be configured to seal the injector port with the inlet liner. Wherein, the injection manifold may be configured to be flash heated for heating up the inlet liner. In select embodiments, a bottom of the injection manifold may be positioned in a recess in a top of a mating box of the positioning system.

In another aspect, the instant disclosure embraces a method of positioning an inlet liner with a column of a gas chromatograph device. The instant method of positioning an inlet liner with a column of a gas chromatograph device may generally include the step of providing the positioning system for an inlet liner and a column of a gas chromatograph device in any of the various embodiments shown and/or described herein. In general, the provided positioning system may include: the injector port pin connected to the first tip of the column; the mating device configured to receive and position the inlet liner, said mating device is configured to hold a bottom of the inlet liner at a first specific location in the positioning system; and the mating surface configured to receive and position the injector port pin, said mating surface is configured to hold a first tip of the injector port pin at a second specific location in the positioning system. Whereby, the combination of the mating surface and the mating device may be configured to position the first tip of the injector port pin positioned at the second specific location below the bottom of the inlet liner positioned at the first specific location in the perpendicular orientation. As a result, the instant method of positioning an inlet liner with a column of a gas chromatograph device may also include positioning the first tip of the injector port pin positioned at the second specific location below the bottom of the inlet liner positioned at the first specific location in a perpendicular orientation.

In select embodiments of the instant method of positioning an inlet liner with a column of a gas chromatograph device, where the provided positioning system further comprising a trap positioned below the inlet liner, the method may further include collecting unwanted compounds from the inlet liner before reaching the injector port pin of the column in the trap.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which:

FIG. 20 is a top view of the positioning system from FIG. 17 for the inlet liner and the column for the gas chromatograph device according to select embodiments of the instant disclosure with the column partially removed;

FIG. 21 is a right side view of the positioning system from FIG. 17 for the inlet liner and the column for the gas chromatograph device according to select embodiments of the instant disclosure with the column partially removed;

FIG. 22 is a front view of the positioning system from FIG. 17 for the inlet liner and the column for the gas chromatograph device according to select embodiments of the instant disclosure with the column partially removed;

FIG. 23 is a bottom view of the positioning system from FIG. 17 for the inlet liner and the column for the gas chromatograph device according to select embodiments of the instant disclosure with the column partially removed;

Figure 1:
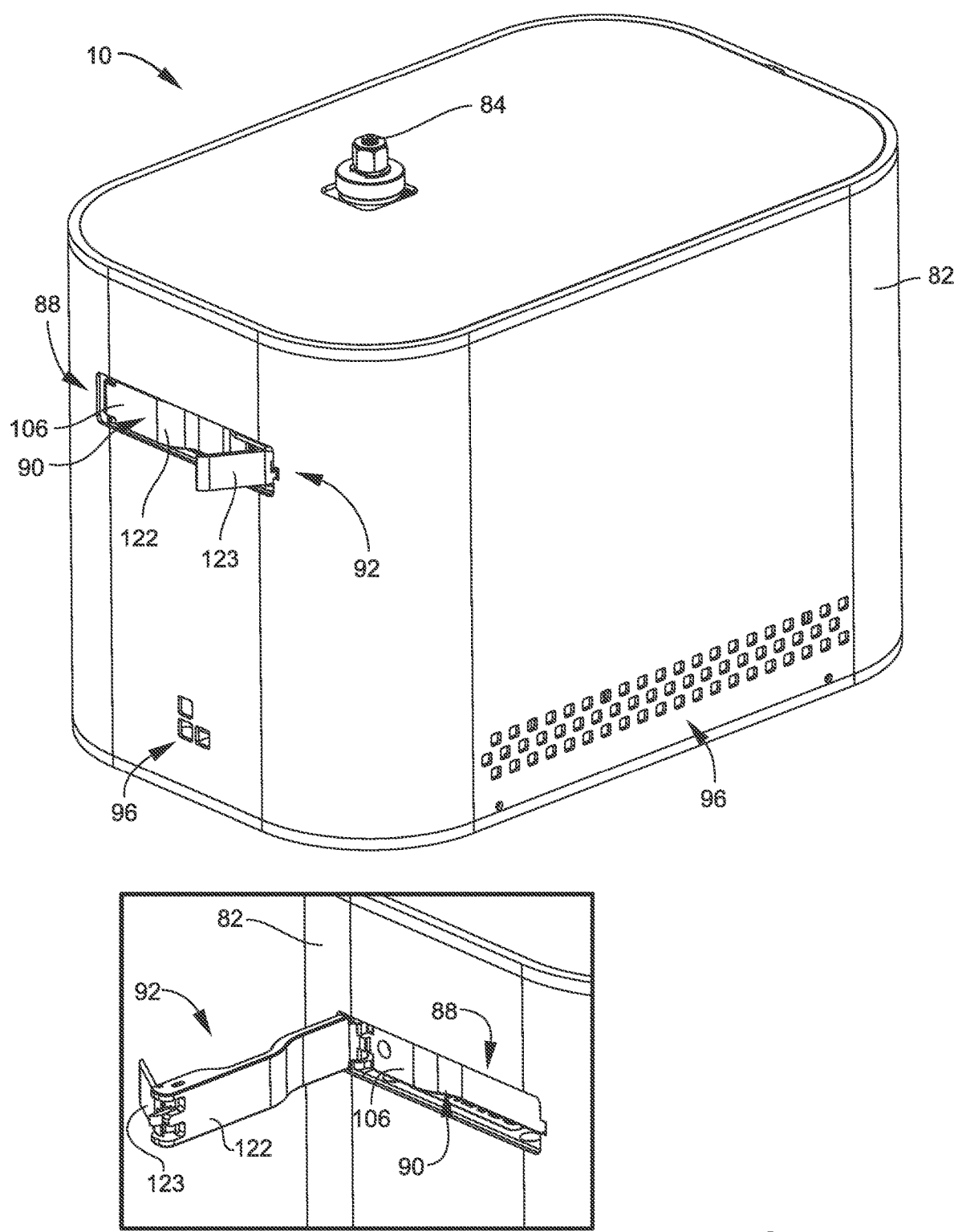
FIG. 1 is perspective front top view of select embodiments of the gas chromatograph device according to the instant disclosure with the locking mechanism locked and unlocked below.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-27, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-26, in a possibly preferred embodiment, the present disclosure overcomes the above-mentioned disadvantages and meets the recognized need for such an apparatus or method by providing of gas chromatograph device 10 with positioning system 200 for inlet liner 202 and column 12. Gas chromatograph device 10 may be referred to herein as gas chromatograph, miniature gas chromatograph, miniature GC, mini gas chromatograph, mini GC, or just GC. Gas chromatograph device 10 may be for gas chromatography (GC), or may be used in analytical chemistry for separating and analyzing compounds that can be vaporized without decomposition. As such, gas chromatograph device 10 may be used for, but is not limited to, testing the purity of a particular substance, or separating the different components of a mixture, and determining the relative amounts of different components of a mixture. As a result, in some situations, gas chromatograph device 10 may be useful in identifying a compound. As another example, in preparative chromatography, gas chromatograph device 10 can be used to prepare pure compounds from a mixture.

Gas chromatograph device 10 may be provided with unique features, including, but not limited to, at least positioning system 200 for inlet liner 202 and column 12, removable column holder 90, column recognition technology for the column 12, inductive heating of column 12, and/or miniaturized dimensions (see FIGS. 1-16). However, although the instant disclosure may be directed to the positioning system 200 for inlet liner 202 and column 12 aspect of gas chromatograph device 10, the disclosure is not so limited, and gas chromatograph device 10 may include these other unique features as well.

In general, the instant disclosure is directed to gas chromatograph device 10 that includes positioning system 200 for inlet liner 202 and column 12. As such, gas chromatograph device 10 may generally include column 12 that is configured for gas chromatography, and positioning system 200 for inlet liner 202 and column 12.

Column 12 may be included in removable column holder 90. Column 12 may be any column configured for chromatography and configured for insertion inside removable column holder 90. Column 12 may include first tip 99 at one end and second tip 101 at its other end. Injector port pin 98 may be connected to first tip 99 and detector pin 100 may be connected to second tip 101.

Referring now to FIGS. 17-26, positioning system 200 for the inlet liner 202 and the column 12 may be included in gas chromatograph device 10. As explained above, column 12 may be configured for gas chromatography. Wherein, positioning system 200 for inlet liner 202 and column 12 may be configured to position inlet liner 202 and column 12 with respect to one another. As a result, positioning system 200 may be designed to repeatably and optimally position inlet liner 202 and column 12 with respect to one another. In select embodiments, positioning system 200 may position inlet liner 202 in perpendicular orientation 204 to column 12. Perpendicular orientation 204 of inlet liner 202 with respect to column 12 may be configured to minimize contamination on column 12.

Figure 24:
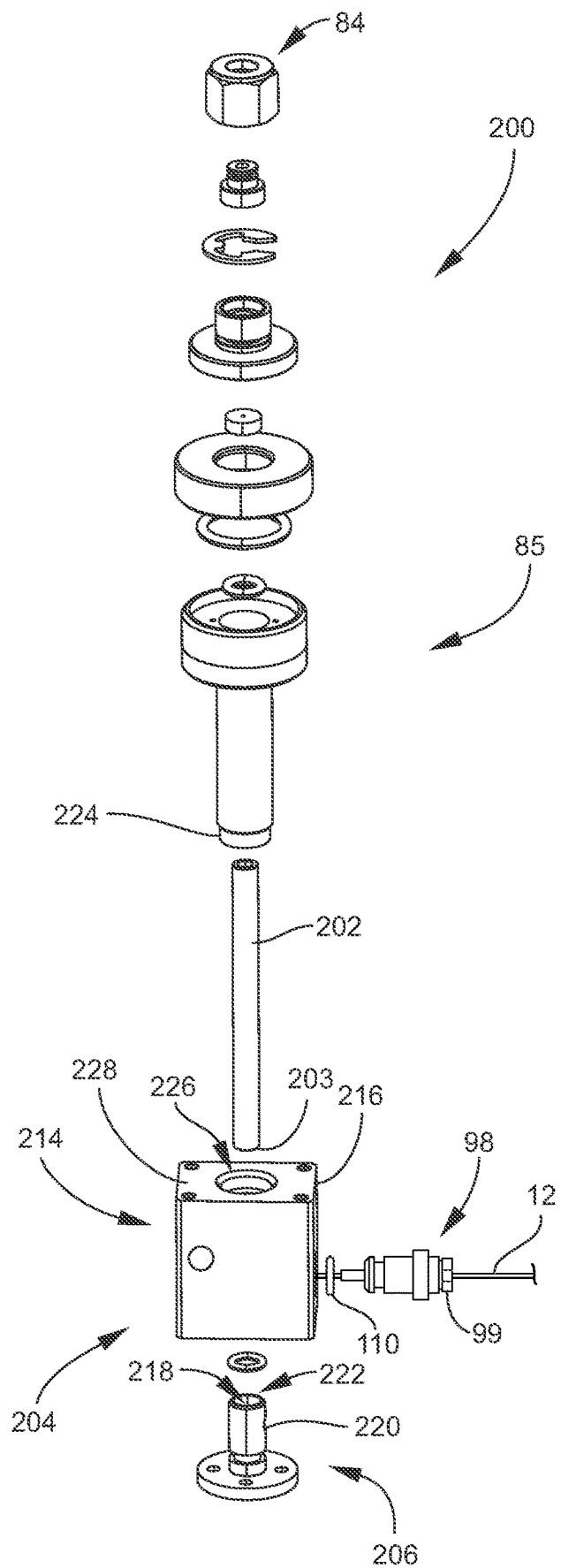
FIG. 24 is a partially disassembled top front perspective view of the positioning system from FIG. 17 for the inlet liner and the column for the gas chromatograph device according to select embodiments of the instant disclosure with the column partially removed.

Positioning system 200 for inlet liner 202 and column 12 may generally include injector port pin 98 connected to first tip 99 of column 12. Wherein, first tip 99 of injector port pin 98 may be positioned below bottom 203 of inlet liner 202 in perpendicular orientation 204. In select embodiments, positioning system 200 may further include mating device 206 and mating surface 210. Mating device 206 may be configured to receive and position inlet liner 202. Mating device 206 may be configured to hold bottom 203 of inlet liner 202 at first specific location 208 (i.e. height and distance from second specific location 212), in positioning system 200 (see FIGS. 25 and 26). As best shown in FIG. 24, mating device 206 may be a cylindrical type device with an open top and a bottom mounted on a disc for stabilizing the device. The cylindrical portion of the mating device 206 may have an opening or hole on its side for communication with first tip 99 of injector port pin 98 of column 12. Mating surface 210 may be configured to receive and position injector port pin 98 with first tip 99 of column 12. Mating surface 210 may be configured to hold first tip 99 of injector port pin 98 at second specific location 212 (i.e. height and distance from first specific location 208), in positioning system 200 (see FIGS. 25 and 26). Whereby, mating surface 210 and mating device 206 may be configured to position first tip 99 of injector port pin 98 positioned at second specific location 212 below bottom 203 of inlet liner 202 positioned at first specific location 208 in perpendicular orientation 204. In select embodiments of positioning system 200, mating device 206 may be positioned in mating box 214. Mating box 214 may have one side 216 with mating surface 210. Wherein, mating device 206 may be positioned inside mating box 214 and may be configured to hold inlet liner 202 at first specific location 208 within mating box 214. Where, mating surface 210 on one side 216 of mating box 214 may be configured to position first tip 99 of injector port pin 98 at second specific location 212 below bottom 203 of inlet liner 202 positioned at first specific location 208 in mating box 214 in perpendicular orientation 204.

Positioning system 200 may further include removable column holder 90. Removable column holder 90 may house column 12. Removable column holder 90 may be configured to be removable from positioning system 200 in gas chromatograph device 10 with column 12. Removable column holder 90 may include injector port pin 98 connected to first tip 99 of column 12 at one end. Injector port pin 98 may be configured to provide first air tight seal 112 to mating surface 210 of positioning system 200 in gas chromatograph device 10. Removable column holder 90 may thus be configured to work in conjunction with positioning system 200 for sealing first tip 99 of column 12 with mating surface 210 in perpendicular orientation 204.

Figure 25:
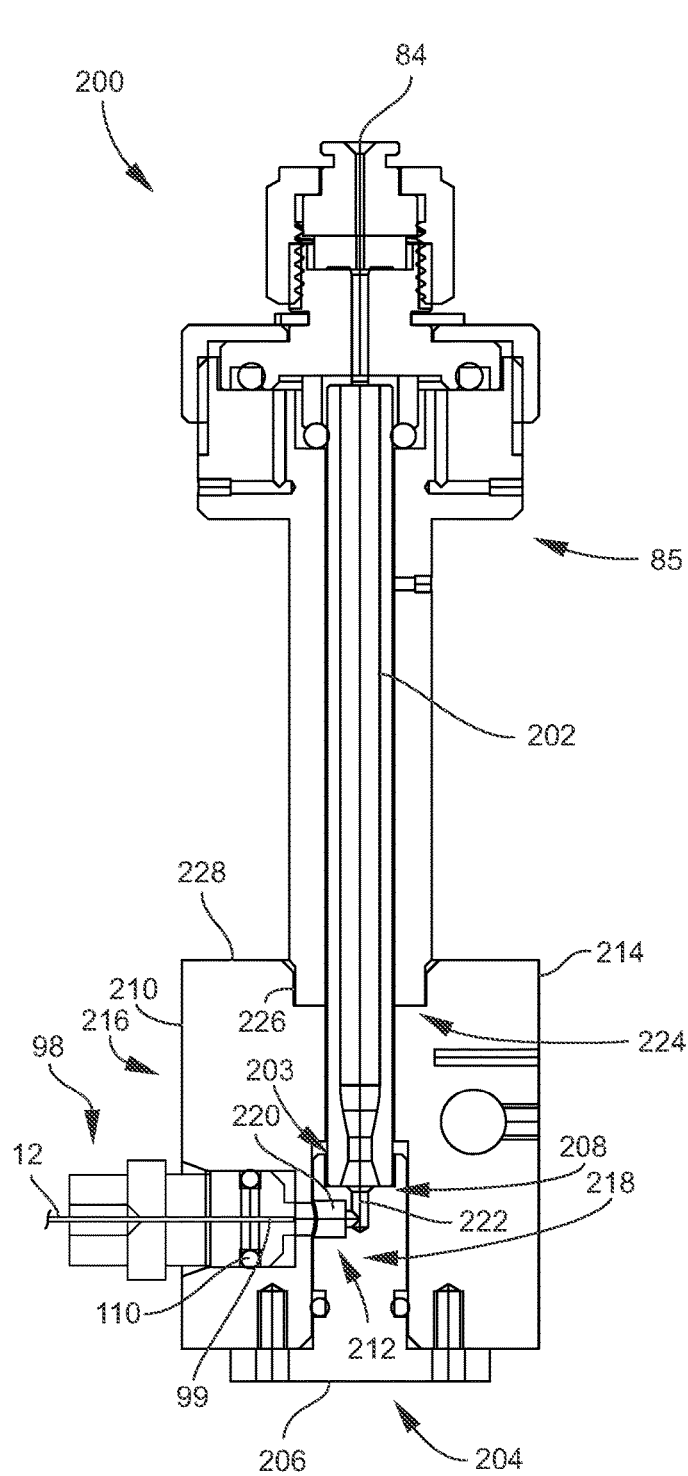
FIG. 25 is a cross-sectional rear view of the positioning system from FIG. 17 for the inlet liner and the column for the gas chromatograph device according to select embodiments of the instant disclosure with the column partially removed.
Figure 26:
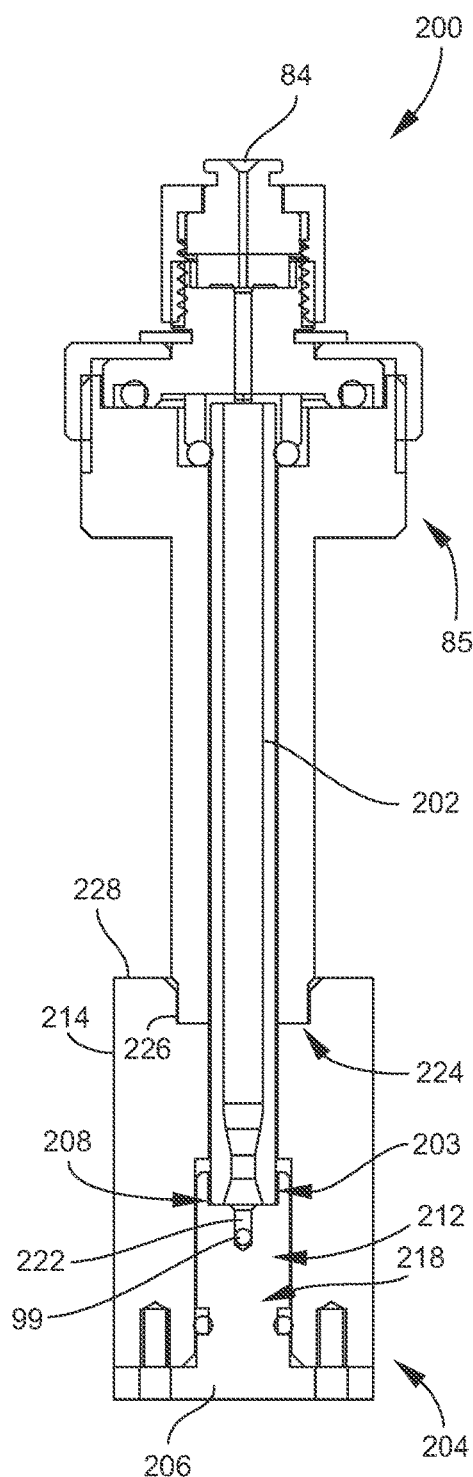
FIG. 26 is a cross-sectional side view of the positioning system from FIG. 17 for the inlet liner and the column for the gas chromatograph device according to select embodiments of the instant disclosure with the column partially removed.

Referring now specifically to FIGS. 24-26, in select embodiments of positioning system 200, trap 218 may be included. Trap 218 may be for collecting unwanted compounds from inlet liner 202 before reaching injector port pin 98 of column 12. Trap 218 may be positioned below bottom 203 of inlet liner 202. Trap 218 may be an opening in the bottom of the cylindrical portion of mating device 206 configured for collecting the unwanted compounds from inlet liner 202 before reaching injector port pin 98 of column 12. Trap 218 may be positioned directly below bottom 203 of inlet liner 202 in a parallel orientation. Whereby, trap 218 may collect the optimum amount of unwanted compounds from inlet liner 202 before reaching injector port pin 98 of column 12.

Referring now specifically to FIGS. 25-26, in select embodiments of positioning system 200, mating device 206 may include side channel 220 and center channel 222. Side channel 220 may be configured to seal to first tip 99 of injector port pin 98 positioned in mating surface 210 at second specific location 212. Side channel 220 may be positioned in the side of the cylindrical portion of mating device 206. Center channel 222 may be configured to seal to bottom 203 of inlet liner 202. Center channel 222 may be positioned down the middle of the cylindrical portion of mating device 206. Side channel 220 may be in fluid communication with center channel 222. Wherein, inlet liner 202 may be in fluid communication with injector port pin 98 of column 12 via fluid communication between side channel 220 and center channel 222 in perpendicular orientation 204.

As shown in FIGS. 17-26, injector port 84 and injection manifold 85 may be included in positioning system 200 for inlet liner 202 and column 12. Injection manifold 85 may be configured to seal injector port 84 with inlet liner 202. Wherein, injection manifold 85 may be configured to be flash heated for heating up inlet liner 202. In select embodiments, bottom 224 of injection manifold 85 may be positioned in recess 226 in top 228 of mating box 214 of positioning system 200.

Removable column holder 90 may be for housing or holding column 12. Removable column holder 90 may be configured to be removable from gas chromatograph device 10 with column 12. As such, when removable column holder 90 is removed from gas chromatograph device 10, column 12 is removed with removable column holder 90 from gas chromatograph device 10. Removable column holder 90 may house only column 12. In other words, removable column holder 90 may not include or house any other parts or features of gas chromatograph device 10. As such, when removable column holder 90 is removed from gas chromatograph device 10, only column 12 and the components of removable column holder 90 may be removed from gas chromatograph device 10. Removable column holder 90 may be configured to allow removing and interchanging of column 12 within removable column holder 90. This may be a simple process, where removable column holder 90 is slit out of cartridge slot 88, where column 12 can be easily accessed for exchanging with another column 12. This may include changing the column within removable column holder 90 or using a new removable column holder 90 with a new column 12. As such, removable column holder 90 can be configured to allow a user to install or exchange a new column 12 into gas chromatograph device 10 without the need for tools. Removable column holder 90 may be configured to protect column 12 within removable column holder 90 from mechanical damage and contamination due to handling. In other words, when removable column holder 90 with column 12 is removed from gas chromatograph device 10, removable column holder 90 may allow one to manipulate, store, transport, etc. column 12 in a safe environment because removable column holder 90 may protect column 12 from mechanical damage and contamination. Removable column holder 90 can be configured to reduce the possibility of error when installing column 12.

Housing 102 may be included with removable column holder 90 of gas chromatograph device 10. Housing 102 may be configured to contain column 12 in removable column holder 90. Housing 102 may contain column 12 inside with injector port pin 98 and detector pin 100 protruding therefrom. Wherein, housing 102 may be configured to keep a user from contaminating first tip 99 or second tip 101 of column 12. Injector port pin 98 and detector pin 100 may protrude from same side of housing 102, like on the back side of housing 102 as shown in the Figures. Whereby, when removable column holder 90 is inserted into gas chromatograph device 10, injector port pin 98 and detector pin 100 may seal to injector port 84 and detector 94, respectively, at the same time. In select embodiments, housing 102 may include plurality of holes, vents, slots, or combinations thereof 104 configured for air flow through column 12. In other select embodiments, housing 102 may include tab 106 configured for gripping removable column holder 90 to insert or remove removable column holder 90 from cartridge slot 88. Tab 106 may protrude from the opposite side of housing 102 as injector port pin 98 and detector pin 100. Tab 106 of housing 102 may also allow a user to manipulate removable column holder 90 with column 12 without contaminating or damaging column 12.

Cartridge slot 88 may be included in gas chromatograph device 10. Cartridge slot 88 may be for positioning removable column holder 90 with column 12 inside gas chromatograph device 10. Cartridge slot 88 may be configured to position injector port pin 98 and detector pin 100 for sealing with injector port 84 and detector 94, respectively. Cartridge slot 88 may include a casing configured to receive removable column holder 90 with column 12. This casing may include a width, depth and height slightly larger than removable column holder 90, to allow removable column holder 90 to be slid in and out of cartridge slot 88. The casing of cartridge slot 88 my include an open end or holes or slots configured to receive injector port pin 98 and detector pin 100 to allow connection with injector port 84 and detector 94, respectively. This casing of cartridge slot 88 may include various holes, vents, slots, or combinations thereof for allowing air flow into column 12 inside removable column holder 90. For providing air flow around column 12, these various holes, vents, slots, etc. may, but are not required to, match up or align with the plurality of holes, vents, slots, or combinations thereof 104 of housing 102 of removable column holder 90. These various holes, vents, slots, etc. of cartridge slot 88 may include, but are not limited to, a hole for positioning heating element or coil 16 of inductive heating source 14 around column 12, like below column 12, as shown in the Figures.

Locking mechanism 92 may be included with gas chromatograph device 10. Locking mechanism 92 may be configured for securing removable column holder 90 with column 12 inside cartridge slot 88 in gas chromatograph device 10. In select embodiments, locking mechanism 92 may provide force on housing 102 of removable column holder 90. This force on housing 102 may provide force to injector port pin 98 and detector pin 100 configured for creating first and second air tight seals 112 and 114 between injector port 84 and detector 94, respectively. As shown in the Figures, in select embodiments, locking mechanism 92 may include, but is not limited to, having mechanical latch 122 with lever 123 configured to engage cartridge slot 88 (or cover 82 or frame 80) for securing removable column holder 90 into cartridge slot 88 with force to engage sealing system 116.

Sealing system 116 may be included with removable column holder 90 of gas chromatograph device 10. Sealing system 116 may be for sealing the respective ends (first tip 99 and second tip 101) of column 12 with injector port 84 and detector 94. Sealing system 116 may be configured to allow gas flow from injector port 84 into column 12 via injector port pin 98, and from column 12 into detector 94 via detector pin 100. Sealing system 116 may be configured to allow the detection of compounds that may only be present in low levels. In select embodiments of sealing system 116, injector port pin 98 may be connected to first tip 99 of column 12 at one end. Injector port pin 98 may be configured to provide first air tight seal to injector port 84 of gas chromatograph device 10. Likewise, detector pin 100 may be connected to second tip 101 of column 12 at its other end. Detector pin 100 may be configured to provide second air tight seal to detector 94 of gas chromatograph device 10. In select embodiments, sealing system 116 may include springs on each of injector port pin 98 and detector pin 100 to engage injector port 84 and detector 94 independently to overcome tolerance issues between different removable column holders 90 and columns 12. In select embodiments, as shown in the Figures, detector O-ring 108 and injector O-ring 110 may also be included. Detector O-ring 108 may be configured for sealing detector pin 100 of column 12 to detector 94 when removable column holder 90 is inserted and locked in cartridge slot 88. Likewise, injector O-ring 110 may be configured for sealing injector port pin 98 of column 12 to injector port 84 when removable column holder 90 is inserted and locked in cartridge slot 88. Detector O-ring 108 and injector O-ring 110 may be configured to seal to detector 94 and injector port 84, respectively, in face sealing arrangement (sealed on the top of the O-rings) and/or plug sealing arrangement (sealed on the outer edges of the O-rings). In select embodiments, injector port pin 98 and detector pin 100 may include tapered features configured for sealing or aiding in sealing to injector port 84 and detector 94, respectively.

An inductive heating source 14 may be included in gas chromatograph device 10. Inductive heating source 14 may be configured to directly or indirectly heat column 12. As disclosed herein, direct inductive heating of column 12 would be applying an inductive current directly to column 12 for heating column 12. On the other hand, as disclosed herein, indirect inductive heating of column 12 would be applying an inductive current to a material or device around column 12 for heating column 12. The inductive heating source 14 may include inductive heating element or coil 16. As such, the inductive heating element or coil 16 may be configured to induce current directly or indirectly in column 12. Wherein, column 12 in the gas chromatograph device 10 may be inductively heated via inductive heating source 14. One feature or benefit of the instant gas chromatograph device 10 may be that it does not require an oven to heat column 12. Prior to the instant disclosure, GC columns were hung in a convection oven that resides within the GC device. Thus, convection heating via air ovens and resistive elements has been the norm. However, these ovens require large spaces and thus take time to heat these spaces up. The instant disclosure of miniature gas chromatograph device 10 utilized inductive heating of column 12 and, thus, does not include an oven. This feature may reduce the time and space required for these convection heating ovens required for prior gas chromatograph devices. As a result, in one aspect, the instant disclosure is directed to gas chromatograph device 10 that has miniaturized dimensions or miniature gas chromatograph 10. Miniature gas chromatograph 10 may be a gas chromatograph that is smaller in size than known standard gas chromatographs.

Figure 2:
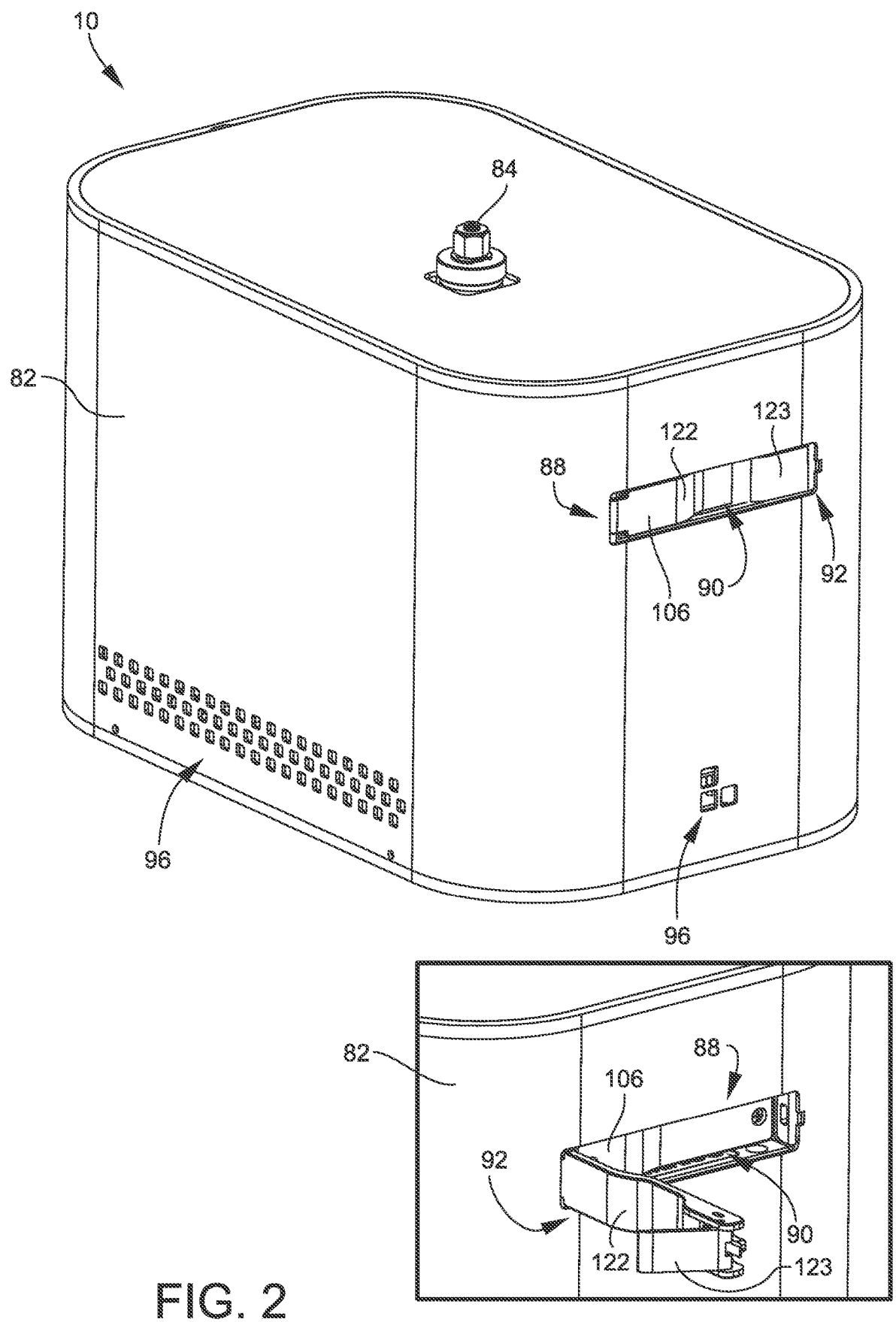
FIG. 2 is another perspective front top view of the gas chromatograph device of FIG. 1 from the other side with the locking mechanism locked and unlocked below.
Figure 3:
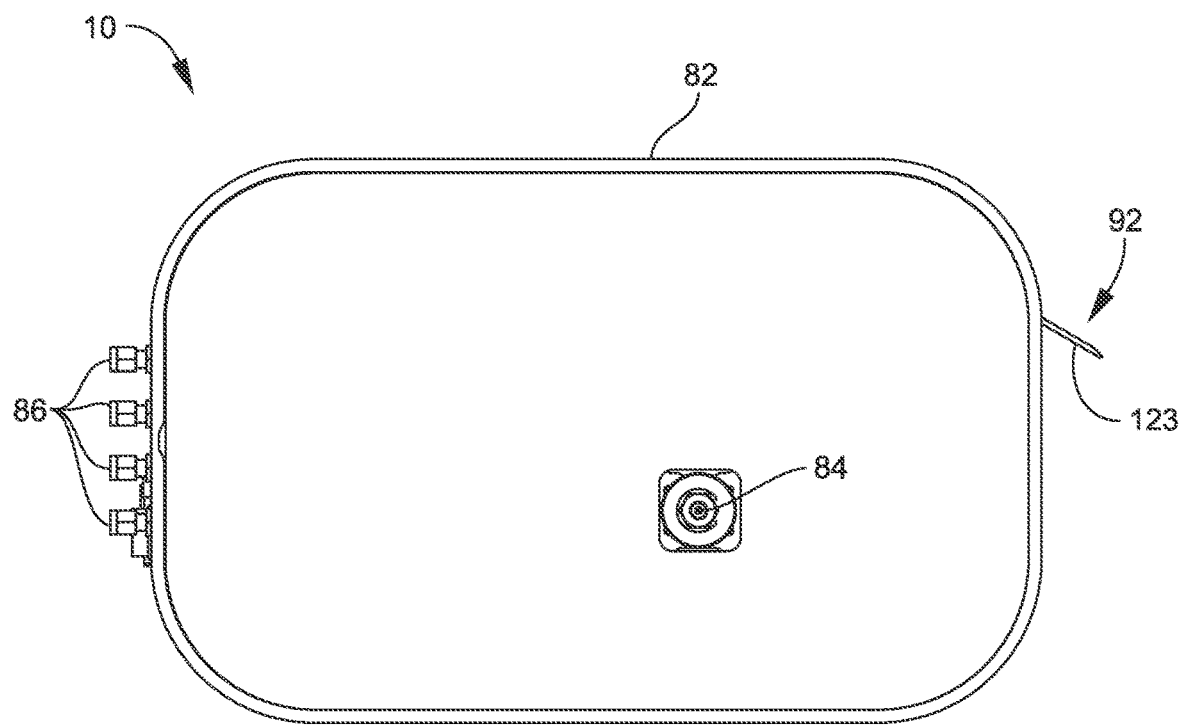
FIG. 3 is a top view of the gas chromatograph device of FIG. 1.
Figure 4:
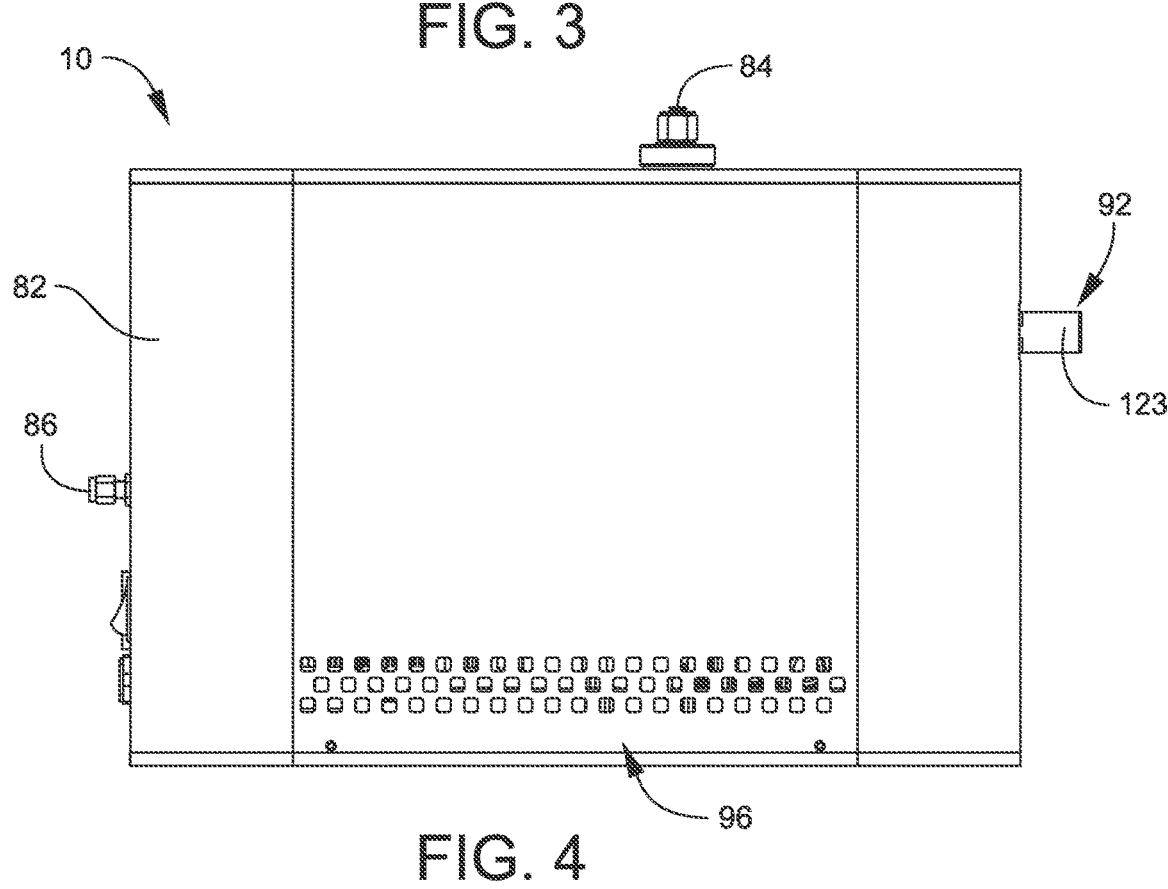
FIG. 4 is a left side view of the gas chromatograph device of FIG. 1.
Figure 5:
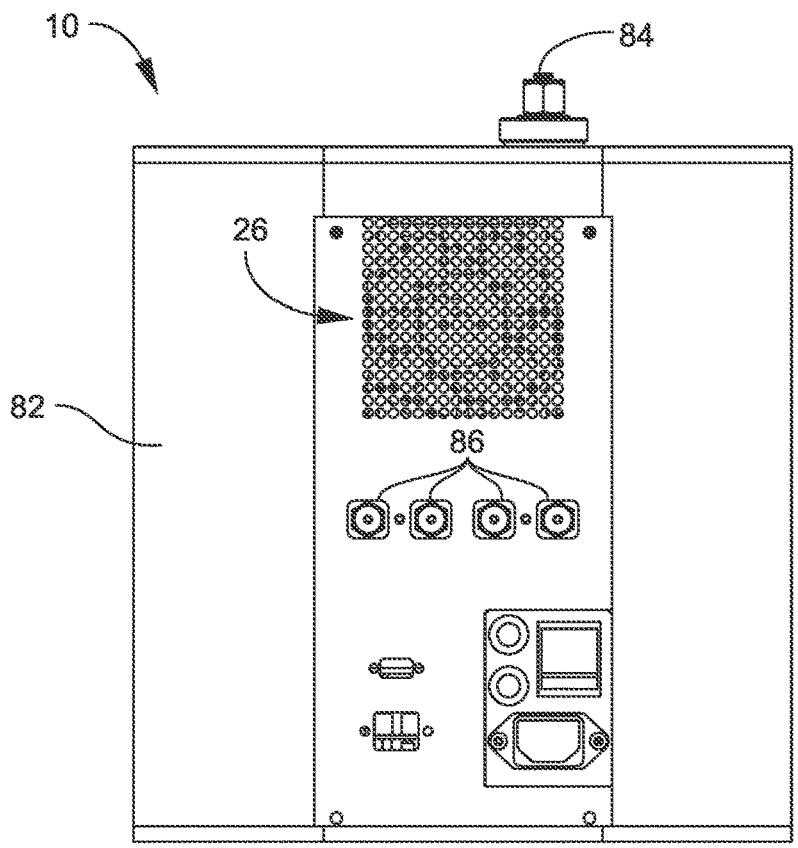
FIG. 5 is a rear view of the gas chromatograph device of FIG. 1.
Figure 6:
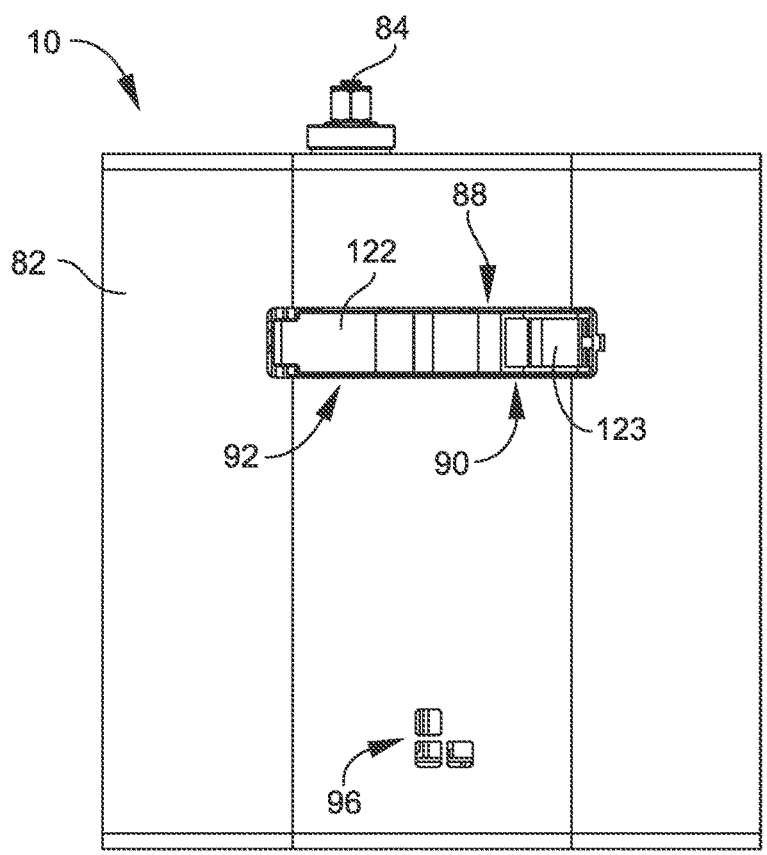
FIG. 6 is a front view of the gas chromatograph device of FIG. 1.
Figure 7:
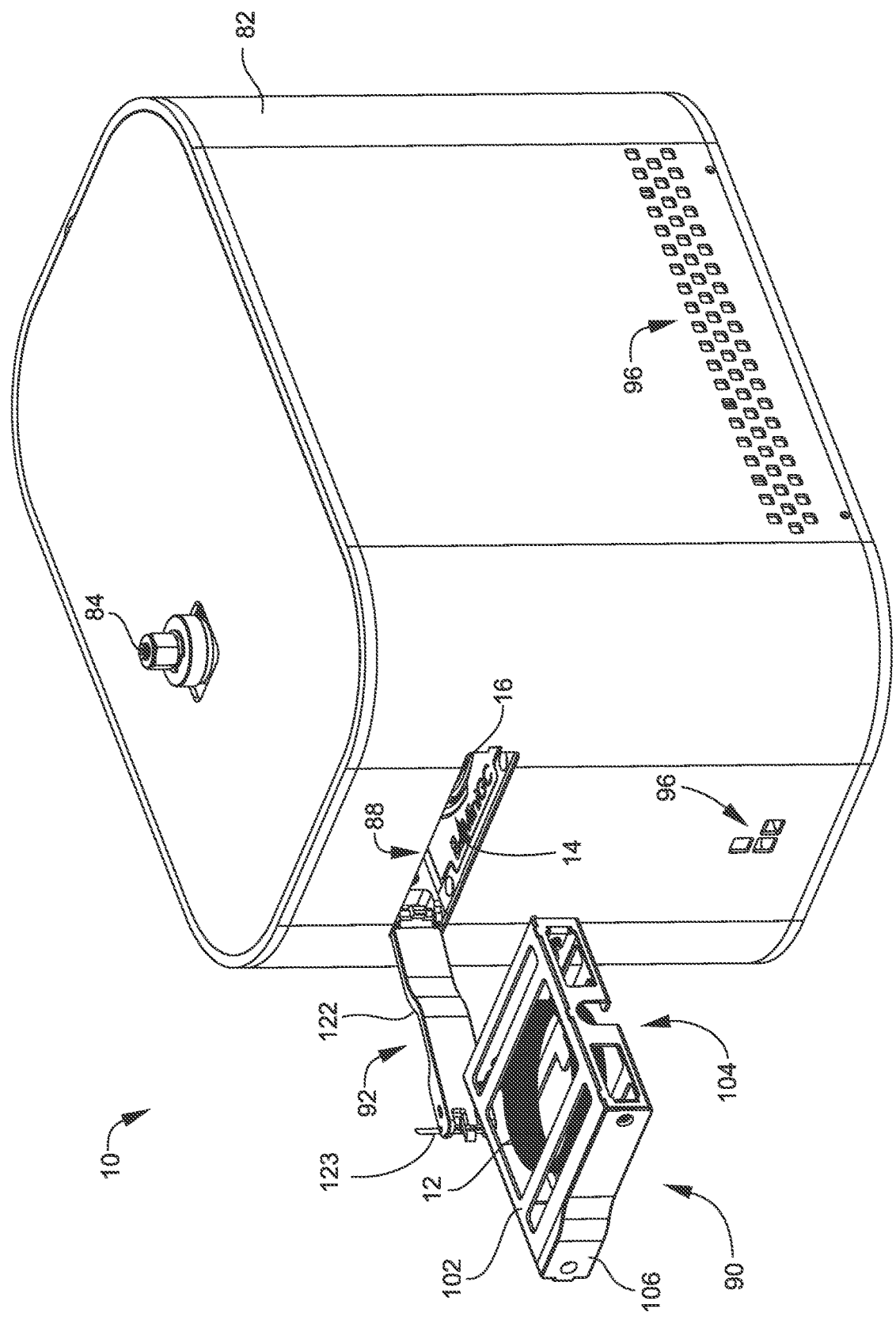
FIG. 7 is a perspective front top view of select embodiments of the gas chromatograph device according to select embodiments with the locking mechanism unlocked and the removable column holder partially removed.
Figure 8:
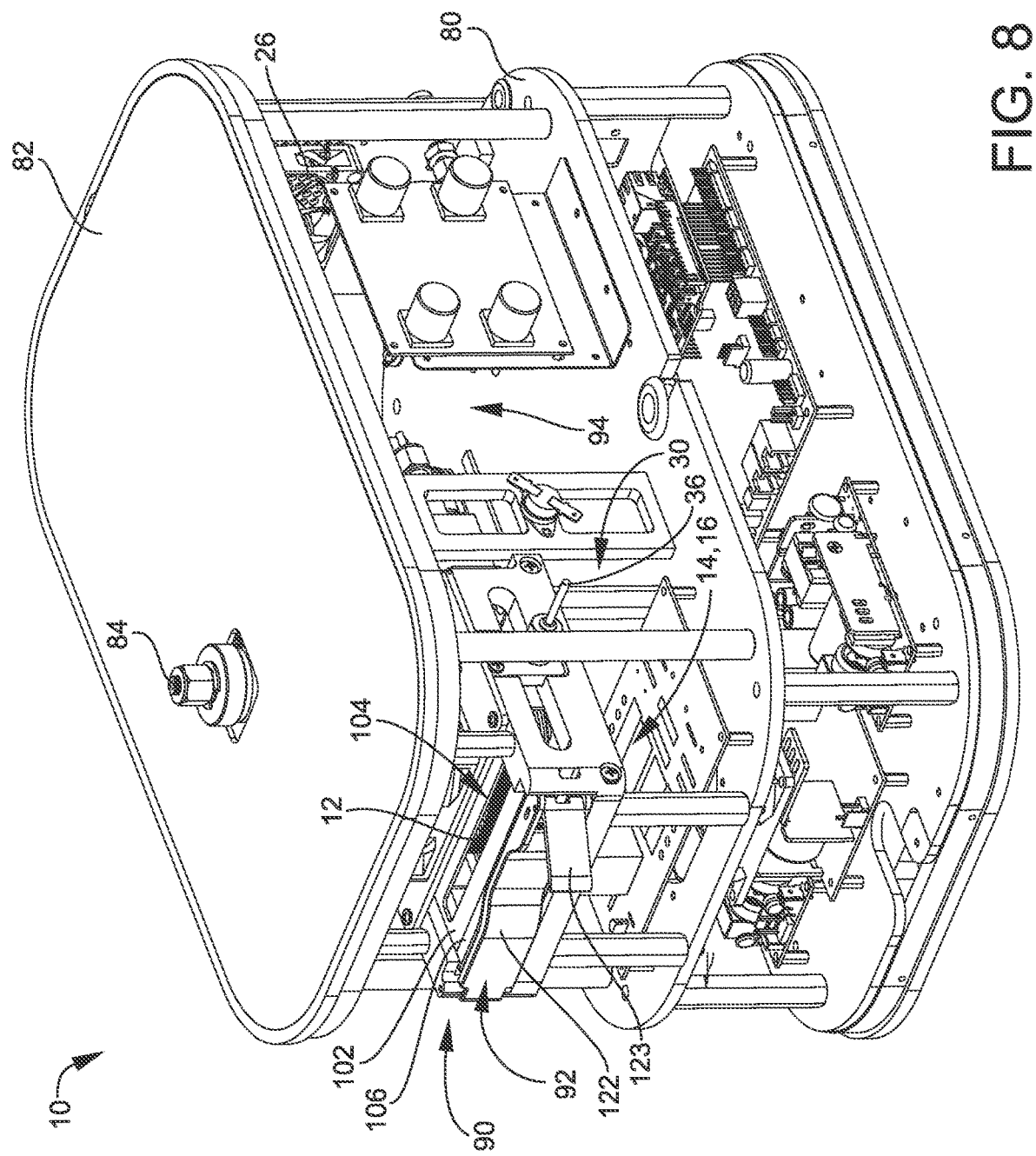
FIG. 8 is perspective front top view of select embodiments of the gas chromatograph device according to the instant disclosure with the cover removed.
Figure 9:
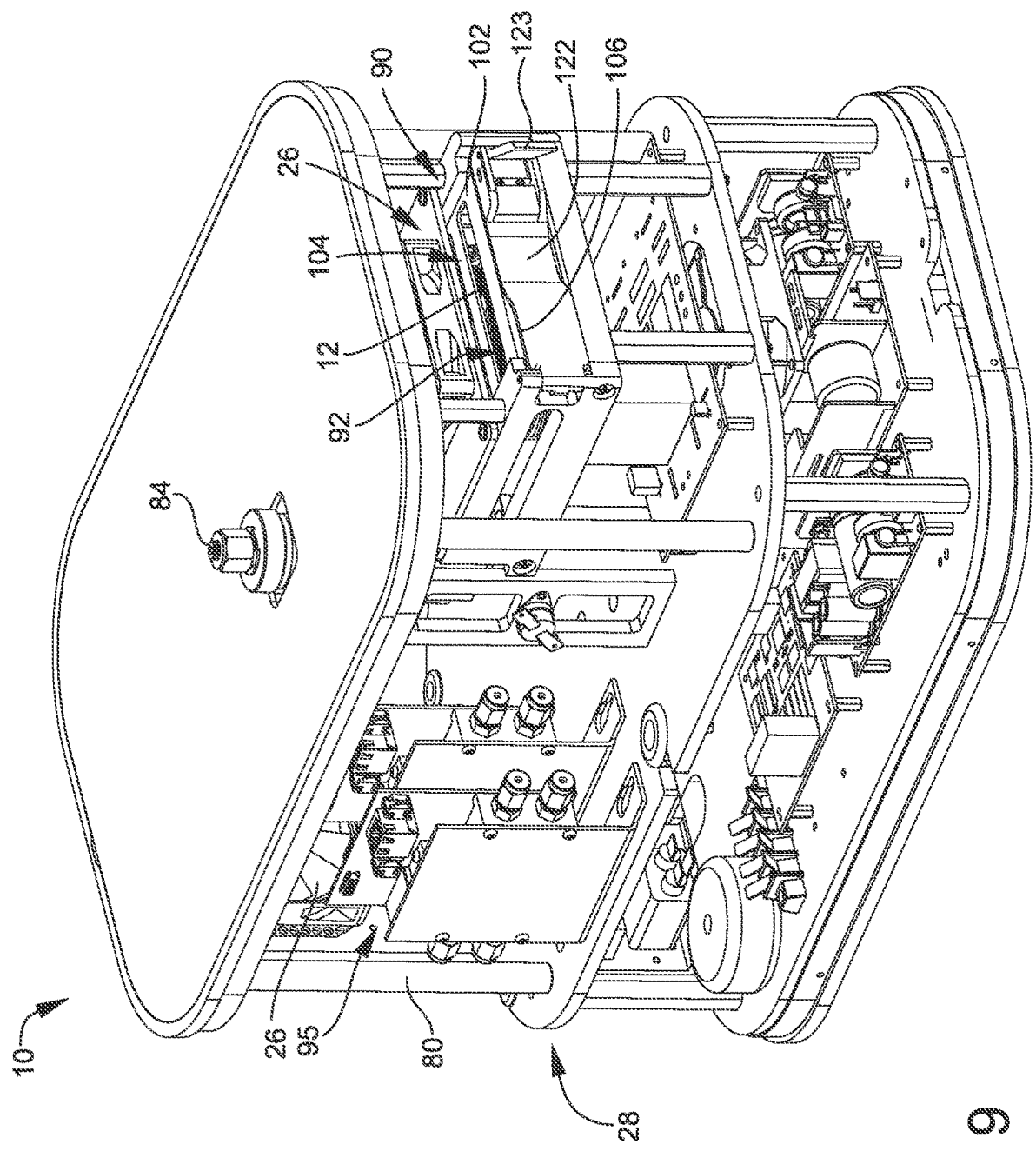
FIG. 9 is another perspective front top view of the gas chromatograph device of FIG. 8 from the other side.
Figure 10:
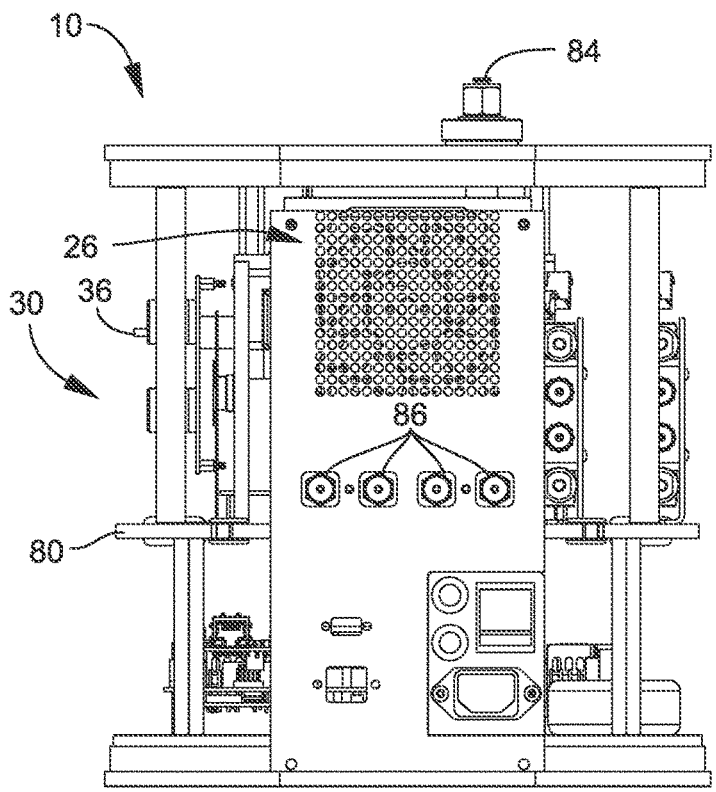
FIG. 10 is a rear view of the gas chromatograph device of FIG. 8.
Figure 11:
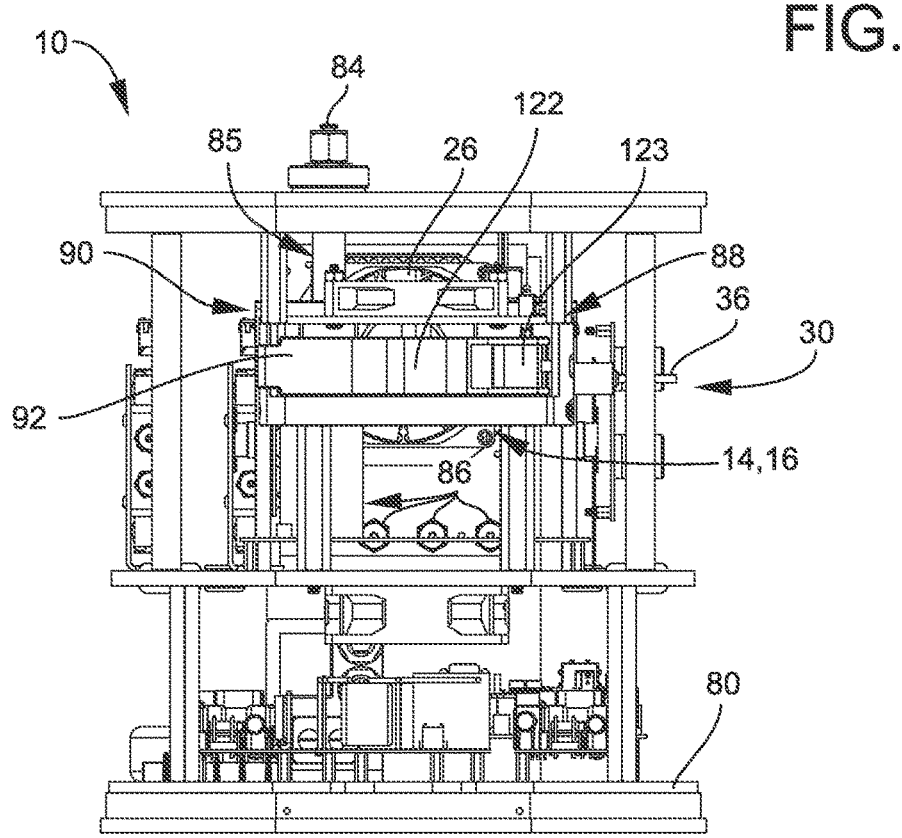
FIG. 11 is a front view of the gas chromatograph device of FIG. 8.
Figure 12:
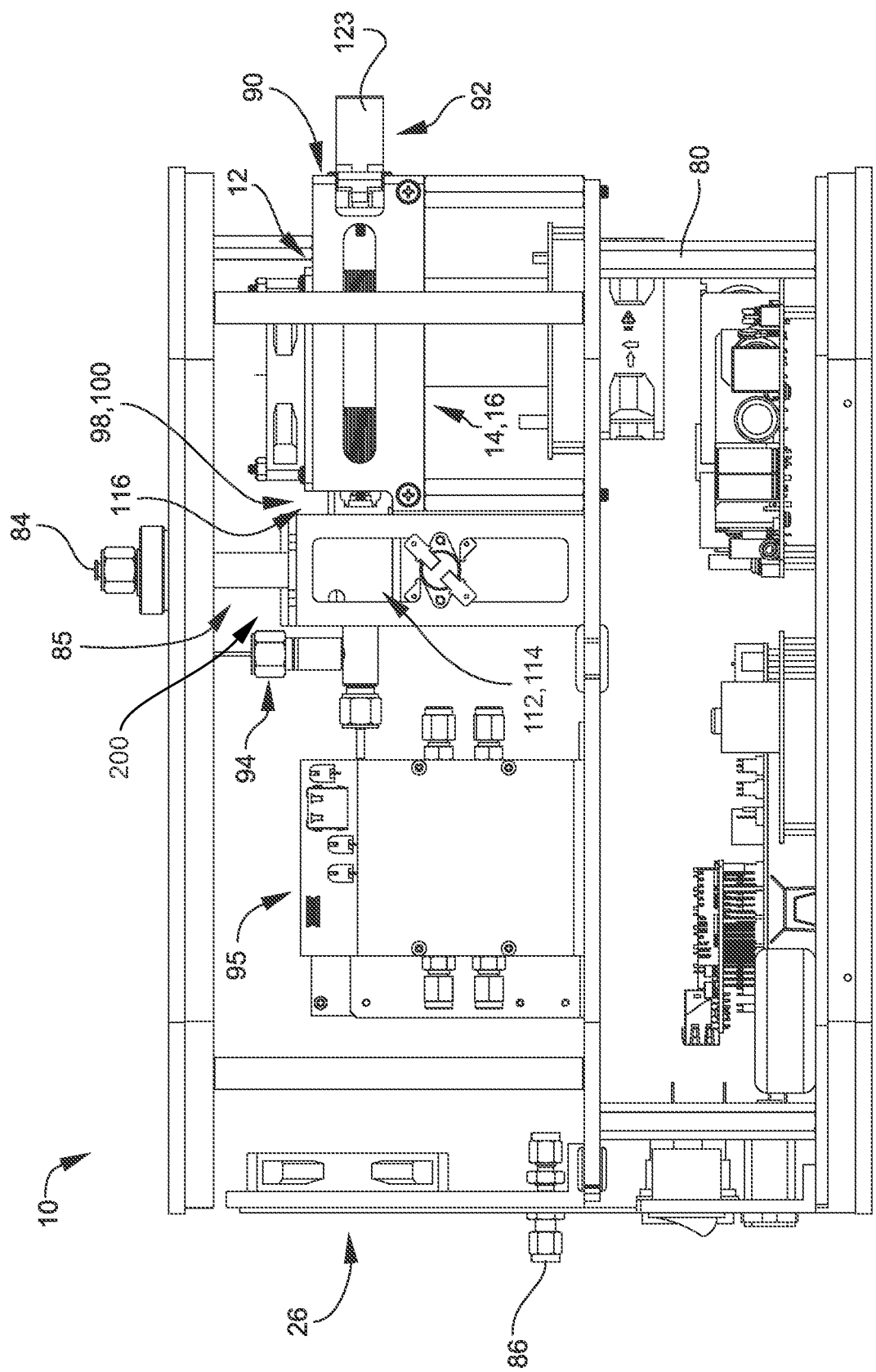
FIG. 12 is a left side view of the gas chromatograph device of FIG. 8.
Figure 13:
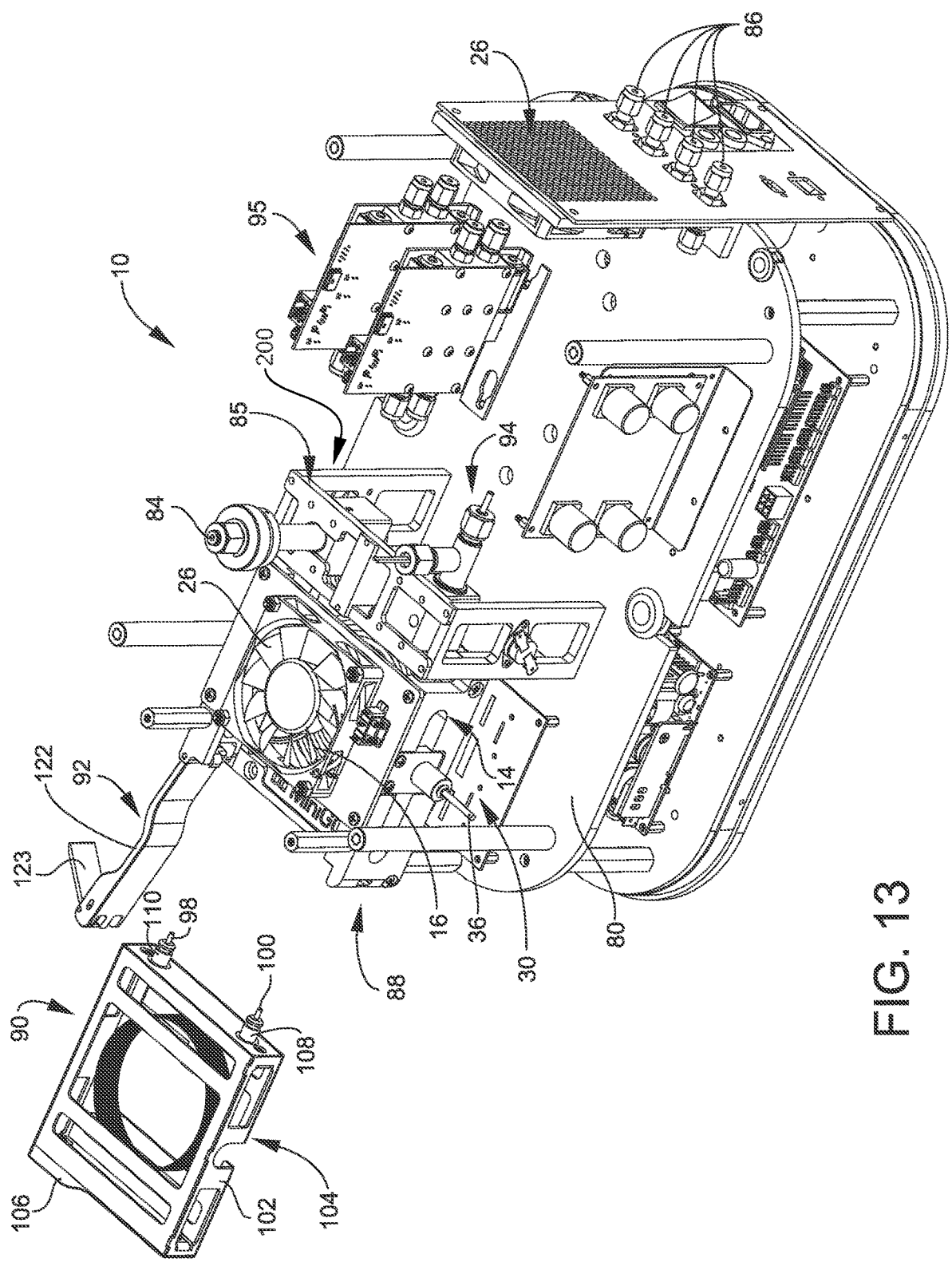
FIG. 13 is a perspective rear top view of select embodiments of the gas chromatograph device according to the instant disclosure without the cover and with the locking mechanism unlocked and the removable column removed.
Figure 14:
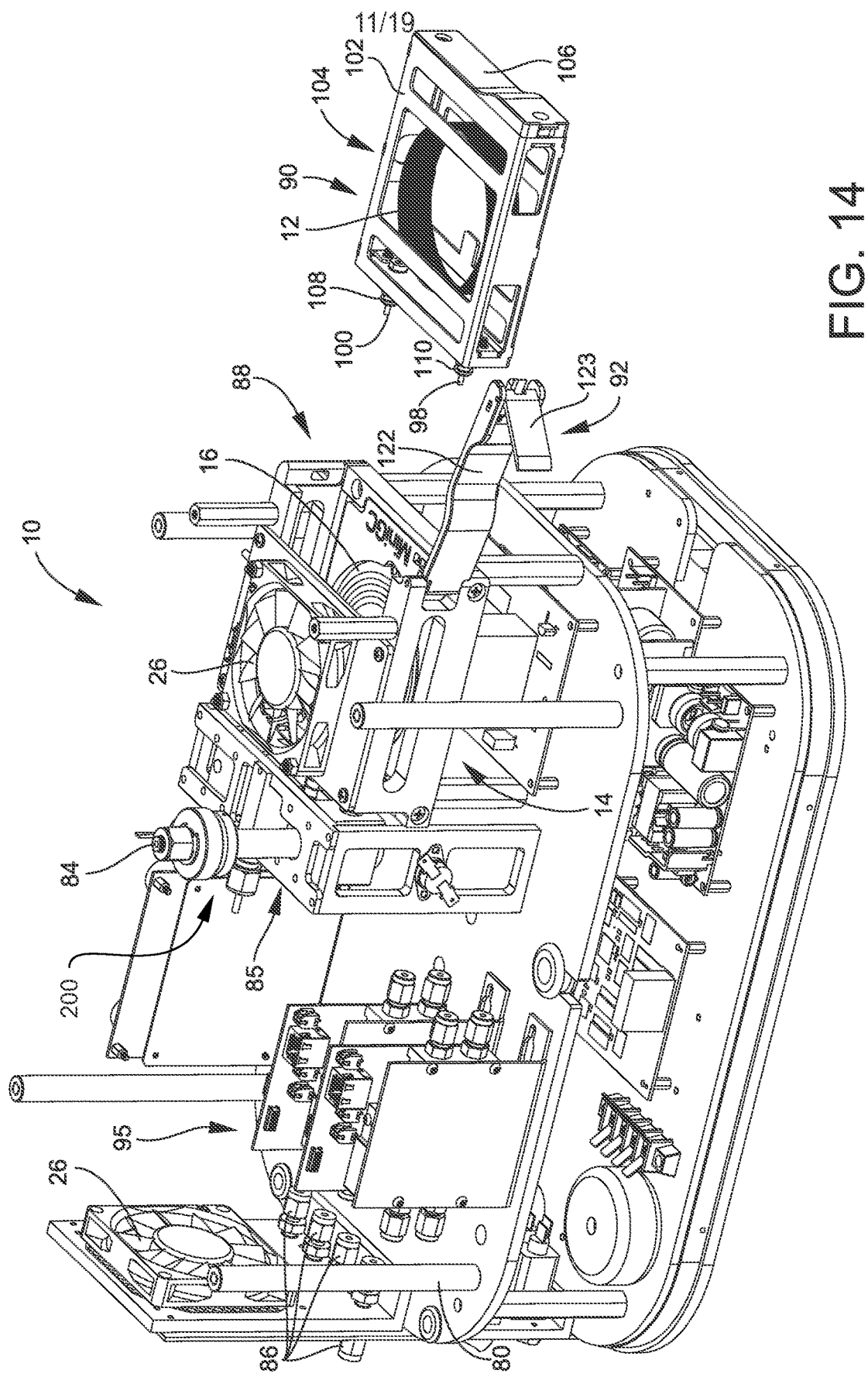
FIG. 14 is a perspective front top view of the gas chromatograph device of FIG. 13.
Figure 15:
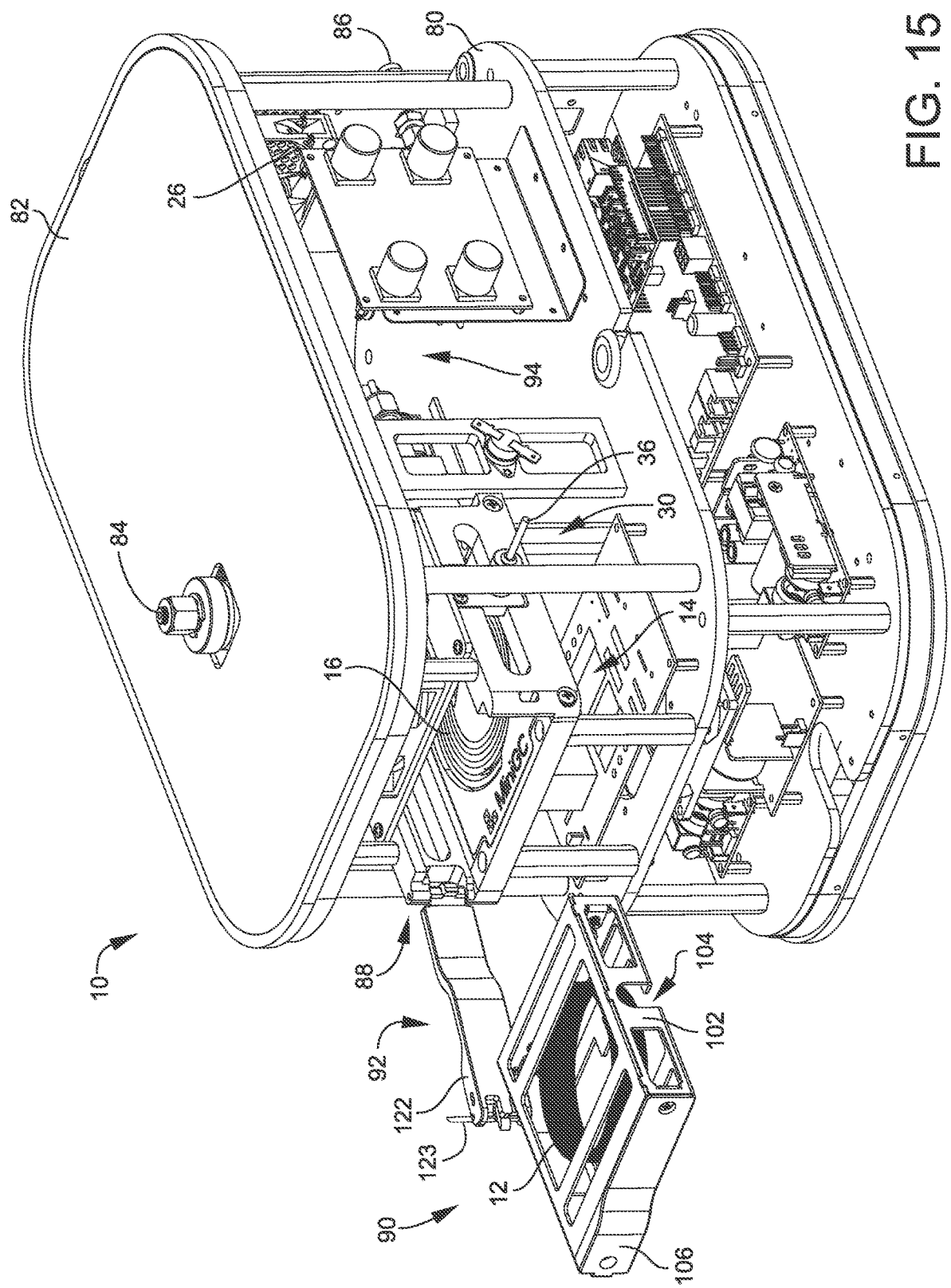
FIG. 15 is a perspective front top view of select embodiments of the gas chromatograph device of FIG. 13 with the cover partially removed except for the top, and with the locking mechanism unlocked and the removable column partially removed.
Figure 16:
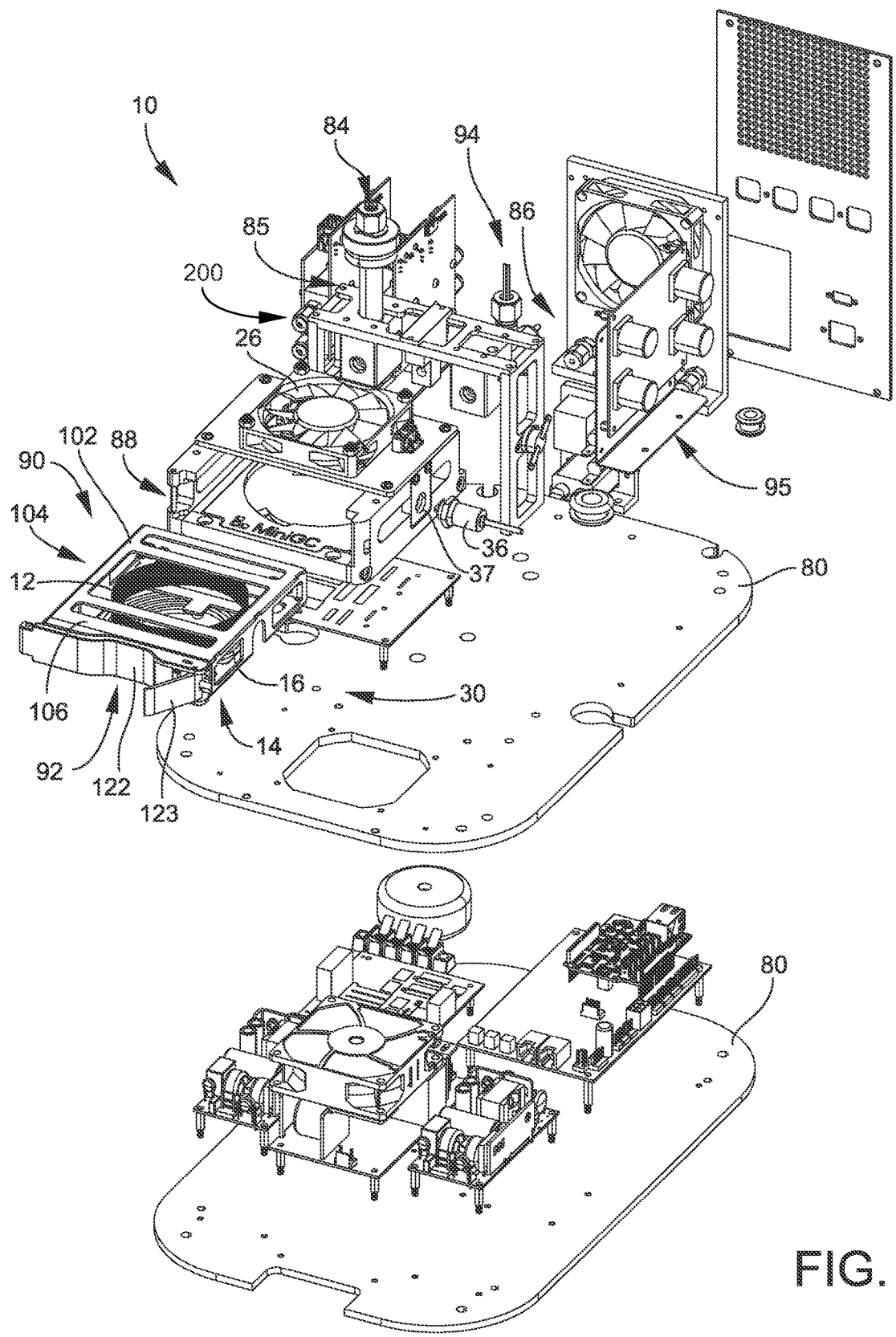
FIG. 16 is a partially disassembled perspective front top view of select embodiments of the gas chromatograph device according to the instant disclosure.
Figure 17:
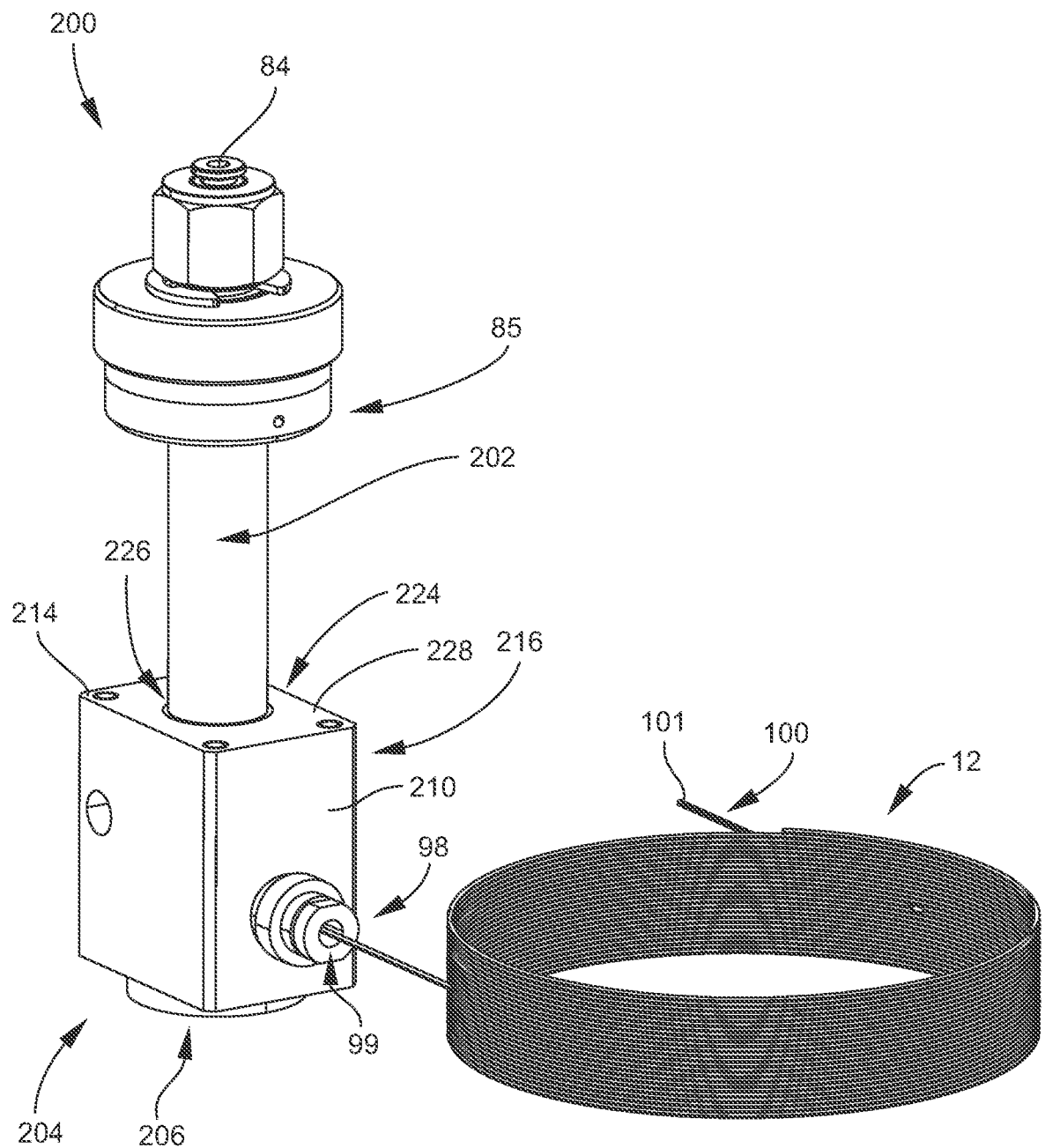
FIG. 17 is a front top perspective view of select embodiments of the positioning system for the inlet liner and the column for the gas chromatograph device according to select embodiments of the instant disclosure.
Figure 18:
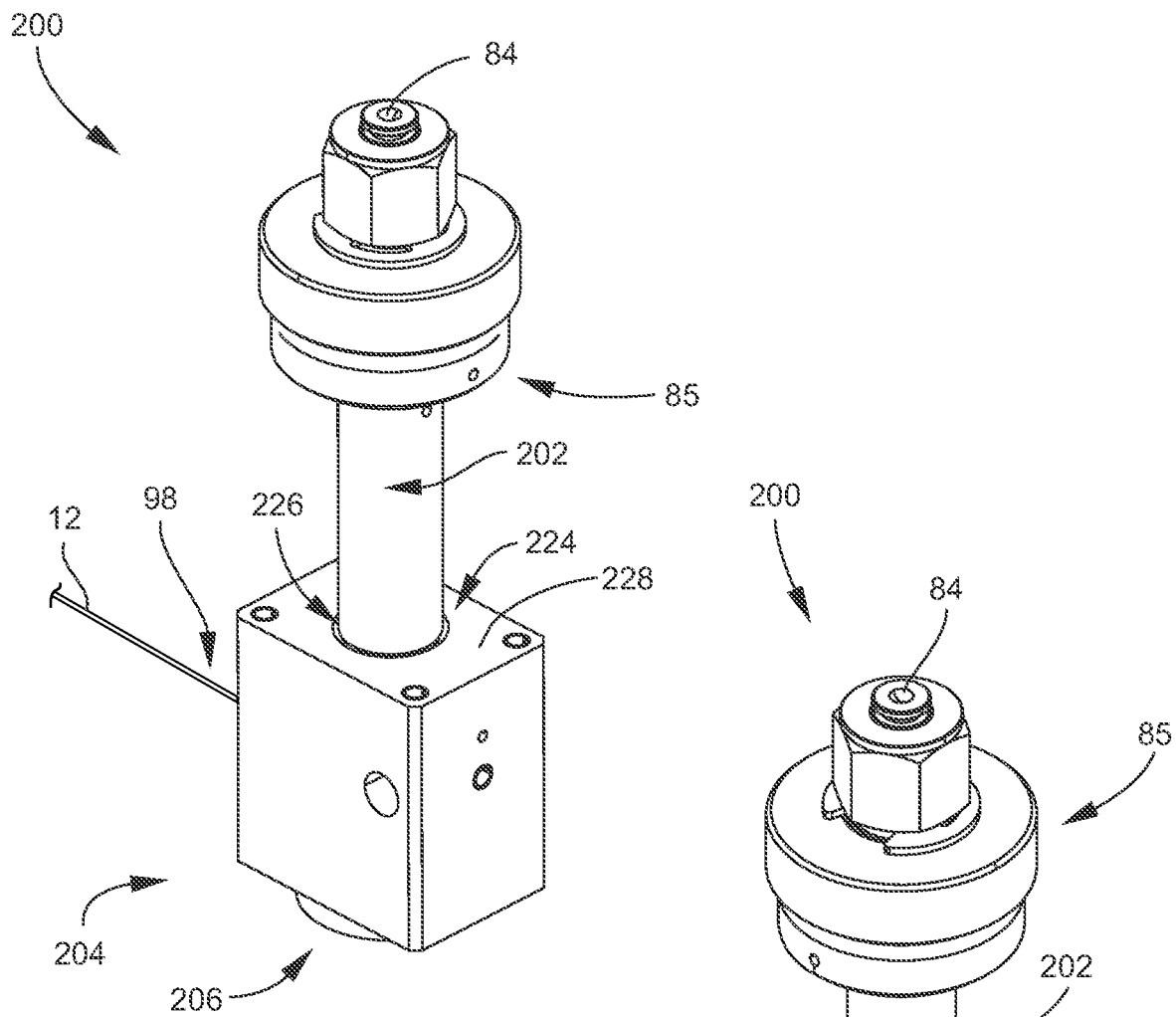
FIG. 18 is a rear top perspective view of the positioning system from FIG. 17 for the inlet liner and the column for the gas chromatograph device according to select embodiments of the instant disclosure with the column partially removed.
Figure 19:
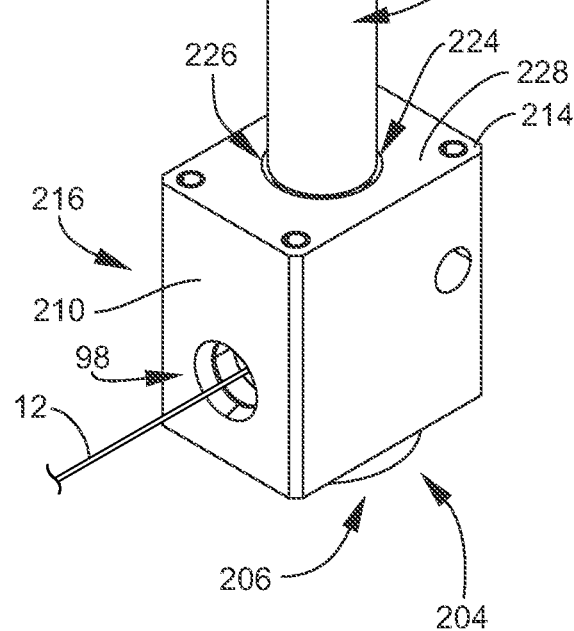
FIG. 19 is a side top perspective view of the positioning system from FIG. 17 for the inlet liner and the column for the gas chromatograph device according to select embodiments of the instant disclosure with the column partially removed.

Referring to FIGS. 1-7, the overall size and shape of select embodiments of the instant gas chromatograph device 10 is shown with the cover on. Referring to FIGS. 8-16, the overall size and shape of select embodiments of the instant gas chromatograph device is shown with the cover removed. These Figures show different perspectives of the overall Mini GC 10. FIG. 1 shows the front of the unit where the removable column holder 90 may be inserted into the system. In FIGS. 1 and 2, the removable column holder 90 is in the system and locking mechanism 92 is shown in a locked position in the top diagram and in an unlocked position in the bottom diagram, where the locking mechanism is swung out for accessing the removable column holder 90 inside cartridge slot 88. However, the instant disclosure is not so limited to this embodiment of locking mechanism 92, and other designs for engaging and disengaging the locking mechanism 92 on the removable column holder 90 may be provided. The chimney looking thing shown sticking up from the top of the unit is the top of injector port 84. This may be where the user would inject a sample from a syringe. On the back of the system, which can be seen in FIG. 5, you can see four gas fittings 86. These are the fittings where the needed gases (Helium, Hydrogen, Purified Compressed Air, or other needed gases) are plumbed into the system. The other openings may be for fans 26 and air movement.

Gas chromatograph device 10 may have a length, a width, and a height. Any and/or all of these dimensions may be smaller than the known standard gas chromatographs for making the instant mini GC 10. In select embodiments, the total volume provided by the length, the width, and the height may be less than 20 cubic feet. In other select embodiments, the total volume provided by the length, the width and the height may be less than 10 cubic feet. In other select possibly preferred embodiment, as shown in the Figures, the total volume provided by the length, the width and the height may be approximately or equal to 1.08574 cubic feet. In select embodiments, the length may be less than 4 feet, the width may be less than 4 feet, and/or the height may be less than 4 feet. In other select embodiments, the length may be less than 3 feet, the width may be less than 2 feet, and/or the height may be less than 2 feet. In other select possibly preferred embodiments, as shown in the Figures, the length may be approximately or equal to 16.4 inches, the width may be approximately or equal to 10.4 inches, and the height may be approximately or equal to 11.0 inches. However, the disclosure is not so limited, and any desired shape and/or sizes of gas chromatograph 10 may be provided.

As a result of these smaller or miniaturized dimensions, the instant gas chromatograph 10 may be designed to provide a smaller more portable gas chromatograph that will allow for the unit to take up minimum space and thus be more readily available to multiple users inside and outside of academia and/or industrial labs.

Referring now to FIGS. 8, 9, 11-16, inductive heating source 14 with inductive heating element or coil 16 may be included for inductively heating column 12. In select embodiments, as shown in the Figures, inductive heating element or coil 16 may be configured to induce a current directly into skin of outer layer of column 12. Skin of outer layer of column 12 may be any material configured for inductive heating. In select embodiments, skin of outer layer of column 12 may be metal or silica. In select possibly preferred embodiments, skin of outer layer of column 12 may be metal. Column 12 may be any known or later discovered column configured for gas chromatography. In select embodiments, column 12 may be a metal or silica column configured for gas chromatography. Column 12 may be provided in any desires shape or form configured for gas chromatography. In select embodiments, as shown in the Figures, column 12 may be provided in a coiled form. In select embodiments, the inductive heating element or coil 16 may be configured to directly heat column 12 controllably up to needed temperature. Needed temperature may be any needed or required temperature for gas chromatography in column 12. In select embodiments, the inductive heating element or coil 16 may be configured to directly heat column 12 controllably up to needed temperature and hold column 12 at needed temperature, like for specific durations for gas chromatograph within column 12. This may be controlled by various sensors and processors, as shown in the Figures.

Referring now to FIGS. 5 and 8-16, at least one fan 26 may be included in gas chromatograph device 10. Wherein, the inductive heating element or coil 16 may be configured to allow gas chromatograph device 10 to cool column 12 by turning off inductive heating element or coil 16 and blowing or fanning cool air 28 over the column via the fans 26. This may be controlled by various sensors and processors, as shown in the Figures. In select embodiments, as shown in the Figures, two fans 26 may be included in gas chromatograph device 10. In select embodiments, as shown in the Figures, one fan 26 may be included at the rear of the unit and positioned behind a grate or screen for forcing cool air 28 into or out of cover 82 from the rear. Another fan 26 may be included above cartridge slot 88 for forcing air over column 12 when removable column holder 90 is positioned inside cartridge slot 88. Frame 80 of gas chromatograph device 10 may be included, as shown in the Figures, with minimal design and various slots, holes, notches, etc. for allowing air flow through gas chromatograph device 10.

Temperature sensor 30 may be included in select embodiments of gas chromatograph device 10. See FIGS. 8-16. Temperature sensor 30 may be for measuring the temperature of column 12, including, but not limited to, measuring temperature 32 of surface of inductively heated column 12. Temperature sensor 30 may be configured for noncontact, direct temperature measurement of column 12. As such, temperature sensor 30 may be positioned inside gas chromatograph device 10 in any position with a line of sight of column 12 when removable column holder 90 is positioned in cartridge slot 88. As shown in FIGS. 8, 10, 11, 13, 15 and 16, temperature sensor 30 may be mounted in temperature sensor mount 37 on the side of cartridge slot 88. Temperature sensor mount 37 may include a hole configured for receiving temperature sensor 30. This position of temperature sensor mount 37 may provide a clear line of sight of column 12 when positioned in removable column holder 90 in cartridge slot 88 via holes, vents, slots 104 of housing 102 of removable column holder 90. Wherein, temperature sensor 30 may be configured to read surface temperature of surface of column 12 without touching column 12. In select embodiments, inductive heating source 14 may be configured to be controlled by temperature sensor 30. In these embodiments, inductive heating of column 12 may be controlled by the noncontact, direct temperature measurement of column 12. Temperature sensor 30 may be any temperature sensor configured for reading the temperature of column 12. In select embodiments, temperature sensor 30 may be infrared temperature sensor 36, as shown in FIGS. 8, 10, 11, 13, 15 and 16. Infrared temperature sensor 36 may be any infrared sensor or like sensor, configured for noncontact, direct temperature measurement of column 12

Referring to FIGS. 8-16, frame 80 may be included in gas chromatograph device 10. Frame 80 may be for supporting the components and structures of gas chromatograph device 10. As shown in the Figures, frame 80 may be configured for minimum size and structure of gas chromatograph device 10. Frame 80 may include various passageways and air ways for circulating cool air 28 via fans 26 and in and out of vent holes 96 in cover 82. In select embodiments, frame 80 may include two layers, where the top layer may be configured for gas chromatography, and the bottom layer may be configured for the processors for controlling gas chromatography of mini GC 10.

Referring now to FIGS. 1-7, cover 82 may be included with the instant gas chromatograph device 10. Cover 82 may be for protecting the inside components and parts from the outside environment. Cover 82 may include side components as well as a top component. Cover 82 may include vent holes 96 in various positions around cover 82 configured for allowing cool air 28 to flow in and out of gas chromatograph device 10. Cover 82 may include a slot sized to receive removable column holder 90 into cartridge slot 88.

Referring now to FIGS. 1-16, injector port 84 may be included with the instant gas chromatograph device 10. Injector port 84 may be for inserting or injecting the fluid to be analyzed or conducted gas chromatography on, inside gas chromatograph device 10. As shown in the Figures, injector port 84 may be positioned through the top of cover 82 for inserting or injecting the gas inside gas chromatograph device 10. Injector port 84 may be any known or standard injector port for GCs. In select embodiments, injector port 84 may include injection manifold 85. See FIGS. 11-14 and 16. Injection manifold 85 may be for controlling the fluid injected through injector port 84 with fluid introduced into column 12. As such, injection manifold 85 may be in fluid communication with column 12 via injector port pin 98. See FIGS. 13, 14 and 17.

Referring to FIGS. 3-5, 10, and 12-16, gas fittings 86 may be included with the instant gas chromatograph device 10. Gas fittings 86 may be for introducing additional fluids or carrier gases into the gas chromatography process inside mini GC 10. Gas fittings 86, may be positioned on the back of gas chromatograph device 10, as shown in the Figures. In gas chromatography inside mini GC 10, the mobile phase (or "moving phase") may be a carrier gas, usually an inert gas such as helium or an unreactive gas such as nitrogen. Helium remains the most commonly used carrier gas in most common instruments, however hydrogen may be preferred for improved separations. Gas fittings 86 may be the fittings where the needed gases (Helium, Hydrogen, Purified Compressed Air, or other needed gases) are plumbed into the system of gas chromatograph device 10.

Referring now to FIGS. 1-2, 6-9, and 11-25, removable column holder 90 may be included with the instant gas chromatograph device 10. Removable column holder 90 may be for holding column 12. Removable column holder 90 may allow for easy and quick removal and insertion of column 12 to and from cartridge slot 88 of gas chromatograph device 10. Removable column holder 90 may include housing 102 configured to secure column 12 inside removable column holder 90. Housing 102 may include plurality of holes, vents, slots 104, etc. for providing air flow through column 12. Housing 102 may include tab 106 on the outer side of removable column holder 90. Tab 106 may be for manipulating or gripping removable column holder 90, like for inserting and removing removable column holder 90 to and from cartridge slot 88 of gas chromatograph device 10. Removable column holder 90 may include detector o-ring 108 for sealing detector pin 100 to detector 94 (or lines thereto) when removable column holder 90 is inserted into cartridge slot 88 of gas chromatograph device 10. Likewise, removable column holder 90 may include injector o-ring 110 for sealing injector port pin 98 with injector port 84 (or lines thereto) when removable column holder 90 is inserted into cartridge slot 88 of gas chromatograph device 10. Locking mechanism 92 may be included with gas chromatograph device 10. Locking mechanism 92 may be for securing removable column holder 90 inside cartridge slot 88 of gas chromatograph device 10. Locking mechanism 92 may be any device or mechanisms configured for securing removable column holder 90 inside cartridge slot 88 of gas chromatograph device 10. As shown in the Figures, locking mechanism 92 may be a latch system configured to hinge from one side of cartridge slot 88 to the other side for securing removable column holder 90 inside cartridge slot 88.

The instant disclosure is designed to provide a system that is a GC that utilizes removable GC column holder 90 that is small, lightweight, low cost, with an easily removable column, and able to handle a wide variety of GC columns 12. This removable column holder 90 may be unique in that the column holder only holds the column, making it the smallest, lightest, and lowest cost possible. Also, the removable column holder 90 may be very easy to interchange columns 12 into the cartridge and may allow the user to affordably interchange many columns 12. The removable column holder 90 may also protect the fragile column 12 from mechanical damage and contamination due to handling that is common for columns not in holders.

Referring to FIGS. 1-2, 6-9, 11-20 and 23-25, cartridge slot 88 may be included with the instant gas chromatograph device 10. Cartridge slot 88 may be for receiving and removing removable column holder 90 in and out of gas chromatograph device 10. As such, cartridge slot 88 may be configured to receive removable column holder 90 with column 12. Cartridge slot 88 may be designed and sized to receive removable column holder 90. Wherein, the inductive heating source 14 may be positioned above, below, or around cartridge slot 88. In select possibly preferred embodiments, the inductive heating source 14 may be positioned below cartridge slot 88, as shown in the Figures.

Detector 94 may be included in gas chromatograph device 10. See FIGS. 8, 9, and 12-16. Detector 94 may be used for detection during or after the gas chromatography process. As the compounds separate based on their rate of progress through column 12 they will exit column 12 through detector pin 100 and go into detector 94 where detector 94 may report the intensity of each compound which correlates to the amount of that compound. Detector 94 may include detector board 95.

Figure 27:
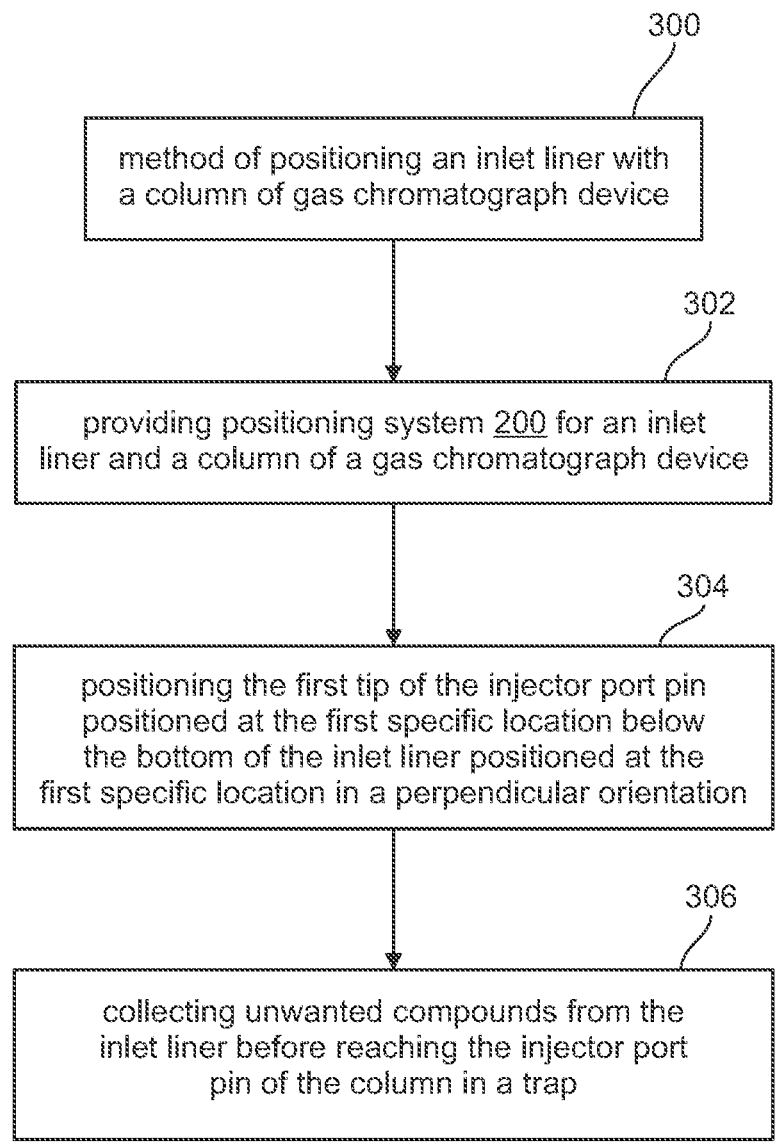
FIG. 27 is a flow diagram of select embodiments of the method of positioning an inlet liner with a column of a gas chromatograph device according to select embodiments of the instant disclosure.

Referring now to FIG. 27, in another aspect, the instant disclosure embraces method 300 of positioning inlet liner 202 with column 12 of gas chromatograph device 10. Method 300 of positioning an inlet liner (like inlet liner 202) with a column (like column 12) of a gas chromatograph device (like gas chromatograph device 10) may generally include step 302 of providing positioning system 200 for inlet liner 202 and column 12 of gas chromatograph device 10 in any of the various embodiments shown and/or described herein. In general, the provided positioning system 200 may include: injector port pin 98 connected to first tip 99 of column 12; mating device 206 configured to receive and position inlet liner 202, mating device 206 is configured to hold bottom 203 of inlet liner 202 at first specific location 208 in positioning system 200; and mating surface 210 configured to receive and position injector port pin 98, mating surface 210 is configured to hold first tip 99 of injector port pin 98 at second specific location 212 in positioning system 200. Whereby, in combination, mating surface 210 and mating device 206 may be configured to position first tip 99 of injector port pin 98 positioned at second specific location 212 below bottom 203 of inlet liner 202 positioned at first specific location 208 in perpendicular orientation 204. As a result, method 300 of positioning inlet liner 202 with column 12 of gas chromatograph device 10 may also include step 304 of positioning first tip 99 of injector port pin 98 positioned at second specific location 212 below bottom 203 of inlet liner 202 positioned at first specific location 208 in perpendicular orientation 204. In select embodiments of method 300 of positioning inlet liner 202 with column 12 of gas chromatograph device 10, where the provided positioning system 200 further included trap 218 positioned below inlet liner 202, method 300 may further include step 306 of collecting unwanted compounds from inlet liner 202 before reaching injector port pin 98 of column 12 in trap 218.

In sum, the instant disclosure may be directed to gas chromatograph device 10 with positioning system 200 for inlet liner 202 and column 12, positioning system 200 itself, and method 300 of positioning inlet liner 202 with column 12 in gas chromatograph device 10. See FIGS. 1-27. The instant disclosure is designed to provide a system that is a GC that utilizes positioning system 200 that is small, lightweight, low cost, with an easily removable column, and able to handle a wide variety of GC columns. Positioning system 200 may be designed and/or configured to repeatably and optimally position inlet liner 202 and column 12 with respect to one another. Positioning system 200 for inlet liner 202 and column 12 may position inlet liner 202 in perpendicular orientation 204 to column 12. Perpendicular orientation 204 may be configured to minimize contamination on column 12.

In typical gas chromatographs, the inlet liner and column are inserted into the GC in such a manner that their position can be adjusted, so the user must be highly trained to ensure that both are in the proper position to give a good chromatogram (sample exits the inlet liner and enters the column for separation so this junction is a very critical one for proper results and positioning is key). In addition, there is inevitably variability in this positioning from user to user, unit to unit, and location to location, which creates variability in the results making samples hard to compare to one another.

On the other hand, positioning system 200 may be designed to repeatedly position inlet liner 202 and first tip 99 of column 12 in the optimal position regardless of user or system and without the user having to decide where to position either of the two. This means more repeatable and comparable data location to location, system to system, user to user, and over time as liners and columns are removed and replaced.

Perpendicular orientation 204, or 90-degree positioning of inlet liner 202 with respect to first tip 99 of column 12 may result in less unwanted contaminants entering first tip 99 of column 12 and contaminating the system or obscuring the data. The unwanted contaminants are typically less volatile compounds that are typically loaded onto the head of the column because of their trajectory through the inlet liner in a linear, parallel, or 180-degree orientation. These compounds then become stuck on the column and can slowly leak through the column for many runs afterward negatively affecting the results of many subsequent runs. In the instant 90-degree orientation 204, these less volatile, unwanted compounds are much less likely to enter column 12, as their trajectory takes them past the entrance of the column of first tip 99, and into trap 218 in the bottom of the inlet manifold or mating device 206. The desired less volatile compounds will be sipped from the inlet stream to give much cleaner results.

A key problem with current gas chromatograph systems is the interchange between the injection liner in the injection manifold and the front end of the column. The user injects a liquid or gas mixture into the injection liner which is flash heated to vaporize most of the components in the mixture and the front end (the head) of the GC column is positioned near the outlet of the injection liner with slight gas flow to "sniff" this component mixture and begin moving the mixture through the column thereby separating the mixture on its way to the detector. In these past systems, the position of the head of the column with respect to the back end of the inlet liner is critically important for the collection of usable data. Variations in this positioning will create variations in the data making it very difficult to reproduce. The current standard practice is to measure how much length of column to allow to protrude through the fitting that secures the head of the column to the injection manifold. The value for this measurement must be looked up online or in the particular instrument operation manual. Even when measured, it will move slightly as the fitting is secured. The inlet liner positioning is determined by the O-ring that is placed around the liner to seal it in the injector port. The value of that position must also be looked up and care must be taken that the position of this O-ring does not change during handling. The current positioning of the inlet liner and the head of the column is extremely variable and prone to a lot of operator error.

The instant disclosure provides a solution to the above problems, difficulties, and variances by providing positioning system 200 with mating device 206 or a positioning piece that inserts into the bottom of injection manifold 85 that positions bottom 203 of inlet liner 202 at a repeatable height every time regardless of how it is installed, i.e. at first specific location 208. It also allows injector port pin 98 of column 12 to be inserted at a 90-degree angle into the bottom of the injection manifold 85. The length of injector port pin 98 and its mating surface 210 ensure the consistent positioning of column 12 with respect to inlet liner 202. The 90-degree orientation 204 may allow any nonvolatile "junk" to move past the head of the column and get collected in trap 218 on the bottom of injection manifold 85 instead of collecting on the head or first tip 99 of column 12 where it can ruin column 12 and give poor chromatograms.

Referring to FIGS. 17-26, these figures give the details on injector port 84. The top of injector port 84 is the part that protrudes from the top of the unit and into which the sample is introduced via syringe. FIGS. 25-26 show cross sections of this port so that you can see the flow paths. The needle of the syringe from which the sample is introduced comes down through a septum, which is shown, and into the main channel. The sample comes out of the syringe needle and expands into inlet liner 202 which is the long vertical cylinder just below the septum (which is represented as a horizontal disc above). The glass inlet liner 202 is contained within a stainless-steel manifold 85. This manifold 85 is maintained at an elevated temperature (typically 300 C), which is translated into the glass inlet liner 202 and the entire injector port 84 causing the sample to vaporize upon injection. FIGS. 25-26 show a detailed call out at the bottom of the cross-section image, and shows how the glass inlet liner 202 rests on the top of the positioning device or mating device 206, which is the piece at the very bottom of the assembly that looks like a disc with a cylinder protruding up from it. The top of this piece has a detail that allows the bottom 203 of the glass inlet liner 202 to rest in it. The holes in this piece on the side of the cylinder, or the mating surface, allow the injector port pin 98 to insert into this space. This interface between the glass inlet liner 202 and the column 12 is extremely critical and can greatly affect the results. The injector port pin 98 and the positioning piece, or mating device 206 and mating surface 210, allow reproducible positioning of the glass inlet liner 202 and the column 12 with respect to one another as well as the novel 90-degree positioning 204.

The instant disclosure of positioning system 200 for inlet liner 202 and column 12 of gas chromatograph device 10 may provide a novel 90-degree orientation 204 and positioning system 200 that may result in much more repeatable chromatograms, even system to system and column to column, and may accordingly increase column lifetime. Positioning system 200 may also allow a novice to use the system and get better results than a professional can on a traditional system.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A gas chromatograph device comprising:
a column configured for gas chromatography;
a positioning system for an inlet liner and the column;
wherein the positioning system for the inlet liner and the column being configured to position the inlet liner and the column with respect to one another; and
wherein the positioning system for the inlet liner and the column positions the inlet liner in a perpendicular orientation to the column, wherein the perpendicular orientation is configured to minimize contamination on the column.

2. The gas chromatograph device according to claim 1, wherein the positioning system for the inlet liner and the column being configured to repeatably and optimally position the inlet liner and the column with respect to one another.

3. The gas chromatograph device according to claim 1, wherein the positioning system comprising:
an injector port pin connected to a first tip of the column;
wherein, a first top of the injector port pin is positioned below a bottom of the inlet liner in the perpendicular orientation.

4. The gas chromatograph device according to claim 3, wherein the positioning system further comprising:
a mating device configured to receive and position the inlet liner, said mating device is configured to hold the bottom of the inlet liner at a first specific location in the positioning system; and
a mating surface configured to receive and position the injector port pin, said mating surface is configured to hold the first tip of the injector port pin at a second specific location in the positioning system;
whereby, the mating surface in combination with the mating device is configured to position the first tip of the injector port pin positioned at the second specific location below the bottom of the inlet liner positioned at the first specific location in the perpendicular orientation.

5. The gas chromatograph device according to claim 4, wherein the mating device is included in a mating box, the mating box having one side with the mating surface, wherein, the mating device is positioned inside the mating box and is configured to hold the inlet liner at the first specific location within the mating box, where the mating surface on the one side of the mating box is configured to position the first tip of the injector port pin at the second specific location below the bottom of the inlet liner positioned at the first specific location in the mating box in the perpendicular orientation.

6. The gas chromatograph device according to claim 4 further comprising:
a removable column holder housing the column, wherein the removable column holder is configured to be removable from the positioning system in the gas chromatograph device with the column, the removable column holder including the injector port pin connected to the first tip of the column at one end, the injector port pin is configured to provide a first air tight seal to the mating surface of the positioning system in the gas chromatograph device.

7. The gas chromatograph device according to claim 5, wherein the mating device further comprising a trap positioned below the bottom of the inlet liner, said trap being configured for collecting unwanted compounds from the inlet liner before reaching the injector port pin of the column.

8. The gas chromatograph device of claim 5, wherein the mating device including:
a side channel configured to seal to the first tip of the injector port pin positioned in the mating surface at the second specific location; and
a center channel configured to seal to the bottom of the inlet liner, said side channel is in fluid communication with the center channel;
wherein, the inlet liner is in fluid communication with the injector port pin of the column via the fluid communication between the side channel and the center channel.

9. The gas chromatograph device of claim 1 further comprising:
an injector port; and
an injection manifold configured to seal the injector port with the inlet liner;
wherein, the injection manifold is configured to be flash heated for heating up the inlet liner;

wherein a bottom of the injection manifold is positioned in a recess in a top of a mating box of the positioning system.

10. The gas chromatograph device according to claim 1 further comprising:
a frame;
a cover;
gas fittings in fluid communication with an injector port;
a detector; and
at least one vent hole in the cover configured for providing air flow through the column via at least one fan.

11. A positioning system for an inlet liner and a column of a gas chromatograph device comprising:
an injector port pin connected to a first tip of the column;
a mating device configured to receive and position the inlet liner, said mating device is configured to hold a bottom of the inlet liner at a first specific location in the positioning system; and
a mating surface configured to receive and position the injector port pin, said mating surface is configured to hold the first tip of the injector port pin at a second specific location in the positioning system;
whereby, the mating surface in combination with the mating device is configured to position the first tip of the injector port pin positioned at the second specific location below the bottom of the inlet liner positioned at the first specific location in a perpendicular orientation.

12. The positioning system according to claim 11 being configured to repeatably and optimally position the inlet liner and the column with respect to one another.

13. The positioning system according to claim 11, wherein the perpendicular orientation is configured to minimize contamination on the column.

14. The positioning system according to claim 11, wherein the mating device is included in a mating box, the mating box having one side with the mating surface, wherein, the mating device is positioned inside the mating box and is configured to hold the inlet liner at the first specific location within the mating box, where the mating surface on the one side of the mating box is configured to position the first tip of the injector port pin at the second specific location below the bottom of the inlet liner positioned at the first specific location in the mating box in the perpendicular orientation.

15. The positioning system according to claim 14, wherein the mating device further comprising:
a trap positioned below the bottom of the inlet liner, said trap being configured for collecting unwanted compounds from the inlet liner before reaching the injector port pin of the column;
a side channel configured to seal to the first tip of the injector port pin positioned in the mating surface at the second specific location; and
a center channel configured to seal to the bottom of the inlet liner, said side channel is in fluid communication with the center channel;
wherein, the inlet liner is in fluid communication with the injector port pin of the column via the fluid communication between the side channel and the center channel.

16. The positioning system according to claim 11 further comprising:
a removable column holder housing the column, wherein the removable column holder is configured to be removable from the positioning system in the gas chromatograph device with the column, the removable column holder including the injector port pin connected to the first tip of the column at one end, the injector port pin is configured to provide a first air tight seal to the mating surface of the positioning system in the gas chromatograph device.

17. The positioning system according to claim 11 further comprising:
an injector port; and
an injection manifold configured to seal the injector port with the inlet liner;
wherein, the injection manifold is configured to be flash heated for heating up the inlet liner;
wherein a bottom of the injection manifold is positioned in a recess in a top of a mating box of the positioning system.

18. A method of positioning an inlet liner with a column of a gas chromatograph device comprising:
providing a positioning system for the inlet liner and the column of the gas chromatograph device comprising:
an injector port pin connected to a first tip of the column;
a mating device configured to receive and position the inlet liner, said mating device is configured to hold a bottom of the inlet liner at a first specific location in the positioning system; and
a mating surface configured to receive and position the injector port pin, said mating surface is configured to hold the first tip of the injector port pin at a second specific location in the positioning system;
whereby, the mating surface in combination with the mating device is configured to position the first tip of the injector port pin positioned at the second specific location below the bottom of the inlet liner positioned at the first specific location in a perpendicular orientation;
positioning the first tip of the injector port pin at the second specific location below the bottom of the inlet liner, and positioning the bottom of the inlet liner at the first specific location in the perpendicular orientation.

19. The method of positioning the inlet liner with the column of the gas chromatograph device of claim 18, wherein the provided positioning system further comprising a trap positioned below the bottom of the inlet liner, wherein the method further comprising:
collecting unwanted compounds from the inlet liner before reaching the injector port pin of the column in the trap.

20. A gas chromatograph device comprising:
a column configured for gas chromatography;
a positioning system for an inlet liner and the column;
wherein the positioning system for the inlet liner and the column being configured to position the inlet liner and the column with respect to one another
an injector port;
an injection manifold configured to seal the injector port with the inlet liner;
wherein, the injection manifold is configured to be flash heated for heating up the inlet liner; and
wherein a bottom of the injection manifold is positioned in a recess in a top of a mating box of the positioning system.

* * * * *